(12) United States Patent
Ardo

(10) Patent No.: US 7,540,698 B2
(45) Date of Patent: Jun. 2, 2009

(54) LOAD SECURING DEVICE AND METHOD FOR USING THE SAME

(76) Inventor: Louis D. Ardo, 1774 Sophia La., Hinckley, OH (US) 44233

( * ) Notice: Subject to any disclaimer, the term of this patent is extended or adjusted under 35 U.S.C. 154(b) by 0 days.

(21) Appl. No.: 11/367,101

(22) Filed: Mar. 3, 2006

(65) Prior Publication Data

US 2006/0147290 A1    Jul. 6, 2006

Related U.S. Application Data

(62) Division of application No. 10/799,558, filed on Mar. 11, 2004, now Pat. No. 7,056,073.

(60) Provisional application No. 60/454,209, filed on Mar. 12, 2003.

(51) Int. Cl.
*B61D 45/00* (2006.01)

(52) U.S. Cl. ........................................................ 410/96
(58) Field of Classification Search .................. 410/31, 410/32, 34, 36–38, 42–47, 49–50, 96–98, 410/100, 120
See application file for complete search history.

(56) References Cited

U.S. PATENT DOCUMENTS 3,860,263 A * 1/1975 Taylor .......................... 410/12
5,746,554 A * 5/1998 Boydstun et al. .............. 410/12
6,499,199 B2 * 12/2002 Frazier .......................... 24/306

* cited by examiner

*Primary Examiner*—H Gutman
(74) *Attorney, Agent, or Firm*—Fay Sharpe LLP

(57) ABSTRACT

A load securing device (310) is provided with which a flexible tie down (320) is engaged to secure a load (100) to an object (210). The load securing device (310) includes: a first mandrel (312) that is substantially rigid; a second mandrel (312) that is substantially rigid; and, a linkage (318) joining the the first and second mandels (312) to one another.

9 Claims, 25 Drawing Sheets

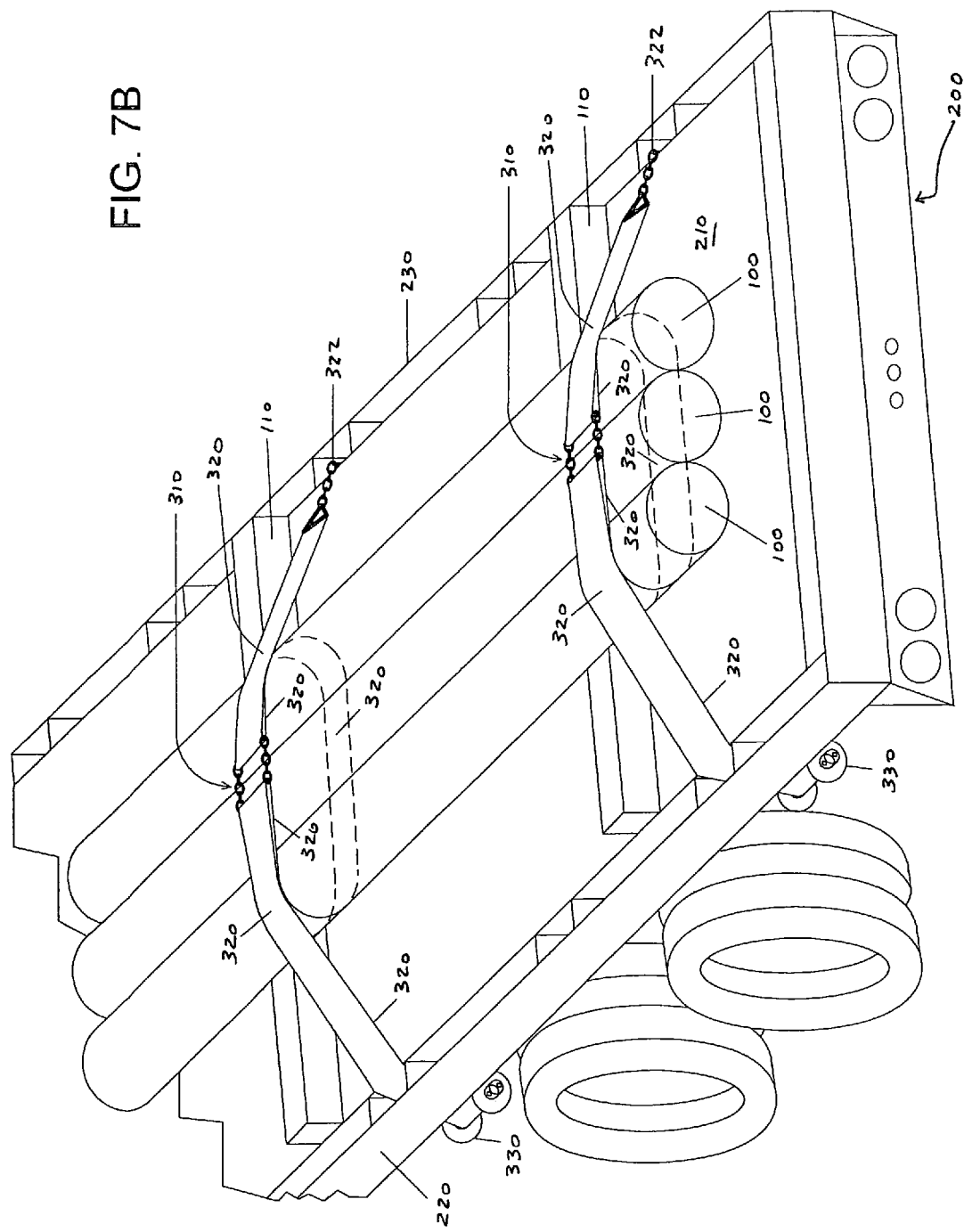

LOAD SECURING DEVICE AND METHOD FOR USING THE SAME

This application is a divisional application of U.S. application Ser. No. 10/799,558, filed Mar. 11, 2004 now U.S. Pat. No. 7,056,073, which claims the benefit of U.S. Provisional Application No. 60/454,209, filed Mar. 12, 2003, the disclosures of which are both incorporated herein by reference in their entirety.

FIELD

The present inventive subject matter relates to the cargo securing arts. It finds particular application in conjunction with the securing of loads to flatbed trailers, and will be described with particular reference thereto. However, it is to be appreciated that it is also amenable to other like applications.

BACKGROUND

Tie down devices and/or methods in general are commonly known and have been traditionally used for securing cargo onto the top surface of flatbed trailers. Known systems often employ one or more winches attached to a side of the trailer. A tie down line is attached at a first end to the winch so as to be selectively wound and unwound therefrom. The leading end of the line opposite the first end is generally free to be extended from or retracted toward the winch and typically has a hook or the like arranged thereon. In operation, the leading end of the line is usually extended from the winch simply over (see, e.g., FIG. 1) or alternately wrapped entirely around (see, e.g., FIG. 2) a load situated on the trailer. The free end of the line is then anchored to the side of the trailer opposite the winch (e.g., using the hook) and the winch is then employed to retract and/or otherwise apply tension on the line thereby tightening the same and securing the cargo. For example, U.S. Pat. No. 5,664,918, incorporated herein by reference in its entirety, discloses a similar type system.

Another system disclosed in U.S. Pat. No. 5,941,665, incorporated herein by reference in its entirety, utilizes a series of strap pairs specifically for securing an automobile to a trailer by its tires. A first elongated strap of the pair is attached to one side of the trailer. A second shorter strap of the pair having two loops at opposing ends is then placed at the outside of the vehicle tire. The first strap is then threaded through the first loop of the second strap, around the back of the tire, through the second loop of the second strap, then secured to the same side of the trailer.

While at times acceptable in certain situations and/or for some applications, the previously developed systems and/or techniques remain limited in various aspects. Often, problems are presented when the load to be secured is of irregular shape or size. Load securement is further complicated when the load includes a plurality of separate items that are stacked upon one another or otherwise arranged to be secured collectively by tie down lines. In such situations, various drawbacks may accompany the previously developed techniques, for example, due to friction, line binding or pinching, etc., when the line is tensioned from the one winch end. See, for example, FIGS. 1-6. Restrictions on the line's freedom to tension equally can create undesirable forces and/or torques on the load as a whole that may bias it in one direction or another to encourage unwanted shifting; or in the case of a plurality of items, unequal tensioning may result in forces and/or torques being unequally applied to each item, again potentially causing unwanted shifting.

As compared to the simple over the top approach, the wrap around approach better secures the load by providing more radially inward securing pressure around the entire outside of a load. However, the wrap around approach also tends to exhibit more uneven tensioning of the line due to increased friction and/or binding that results from greater surface area contact between the load and the line. This uneven tensioning results in uneven application of radially inward forces on the load which can tend to undesirably result in torque being applied to the load as a whole or one or more individual items of the load (see, e.g., FIGS. 2, 4 and 6). Alternately, while simply placing the line over the load may provide for more even tensioning as compared to the wrapped arrangement wherein the line encircles the load, the line-over approach can leave voids between the line and the load (see, e.g., FIGS. 1, 3A and 5) which can result in a greater potential for lateral movement of the load with respect to the trailer bed, either from side-to-side or in the fore and/or aft directions. For example, when the line-over approach is taken, fore and aft movement may be even more likely with respect to the interior items of a multi-item load (see, e.g., FIGS. 3A and 3B); and in a stacked arrangement, a radial downward force on top items unopposed by a radial inward force on bottom outside items may tend to push the bottom items laterally outward (see, e.g., FIG. 5). Even when the individual items are banded together, the resulting uneven and/or unwanted forces can unduly strain the band.

In short, the previously developed techniques and/or approaches create uneven tension along the lines due to friction, binding or like. Disadvantageously, this can result in certain forces and/or torques being developed that are either unwanted and/or undesirably unopposed, thereby creating an unstable load situation which can contribute to unsafe situations and/or which may add to the time and difficulty of suitably securing loads.

Therefore, the present inventive subject matter contemplates a new and improved cargo cinching device and/or method for using the same to produce a combination of direct and indirect cargo securement which overcomes the above-referenced problems and others.

SUMMARY

In accordance with one aspect, a load securing device is provided with which a flexible tie down is engaged to secure a load to an object. The load securing device includes: a first mandrel that is substantially rigid; a second mandrel that is substantially rigid; and, a linkage joining the the first and second mandels to one another.

In accordance with another aspect, a method of securing a load to an object includes: securing a first end of a line to the object; wrapping the line at least partially around a first substantially rigid mandrel at a first location on the line; wrapping a length of the line extending between the first location and a second location on the line at least partially around the load; wrapping the line at least partially around a second substantially rigid mandrel at the second location on the line, the second mandrel being connected to the first mandrel by a linkage; securing a second end of the line to the object; and, removing any slack from the line.

Numerous advantages and benefits of the present inventive subject matter will become apparent to those of ordinary skill in the art upon reading and understanding the present specification. For example, in accordance with one or more embodiments, an advantage is that applied tension to a tie down line can be beneficially distributed in a substantially even and/or equal manner along the length of the line insomuch as undesirable friction, bunching, chafing, binding and/or pinching of the line has been inhibited.

BRIEF DESCRIPTION OF THE DRAWINGS

The present inventive subject matter may take form in various components and arrangements of components, and in various steps and arrangements of steps. The drawings are only for purposes of illustrating preferred embodiments and are not to be construed as limiting the invention. Further, it is to be appreciated that the drawings are not to scale.

FIGS. 7A and 7B are diagrammatic illustrations showing partial perspective views of a load being secured to the deck of a trailer by two exemplary cargo securing systems in accordance with aspects of the present inventive subject matter.

DETAILED DESCRIPTION OF PREFERRED EMBODIMENTS

Figure 1:
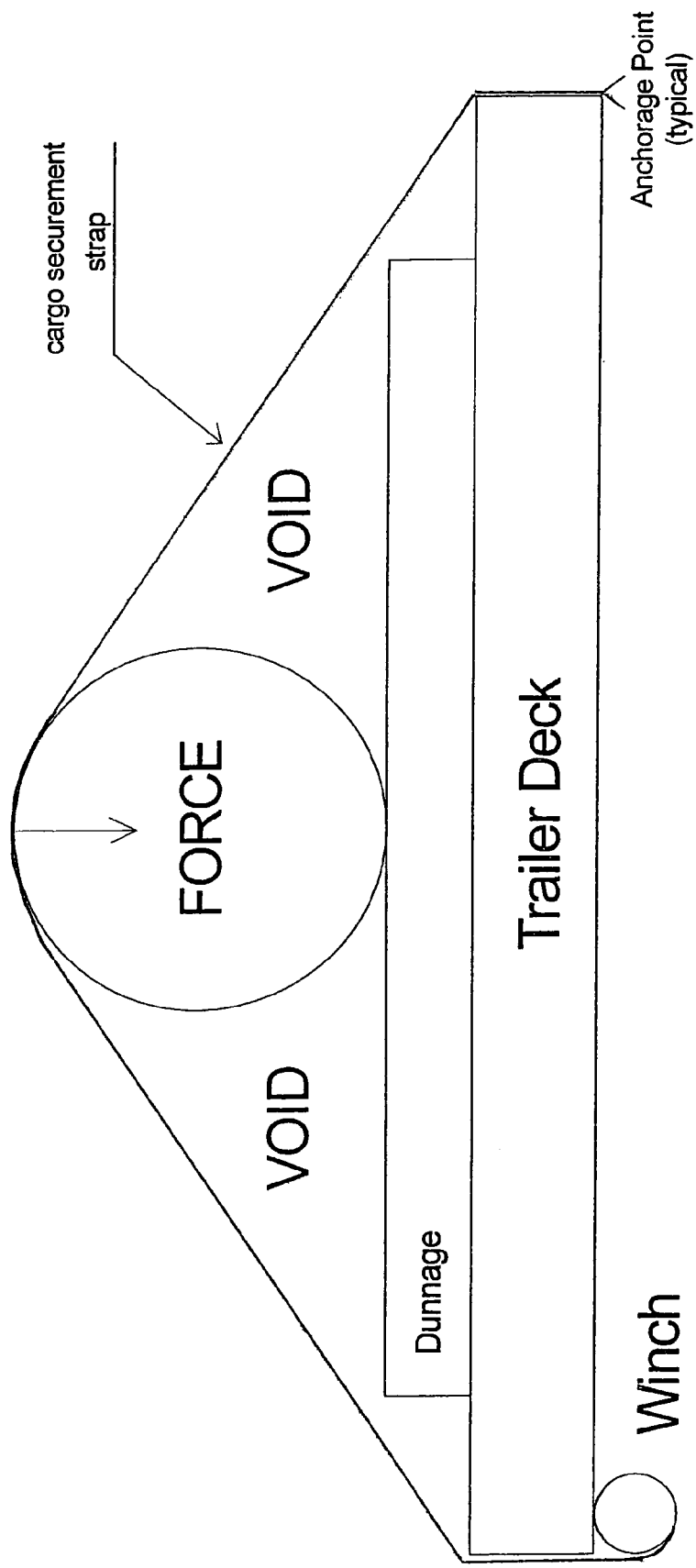
FIG. 1 is a diagrammatic illustration showing a rear elevation view of a single item load secured to a trailer deck in accordance with a conventional line-over-top-of-load approach.
Figure 2:
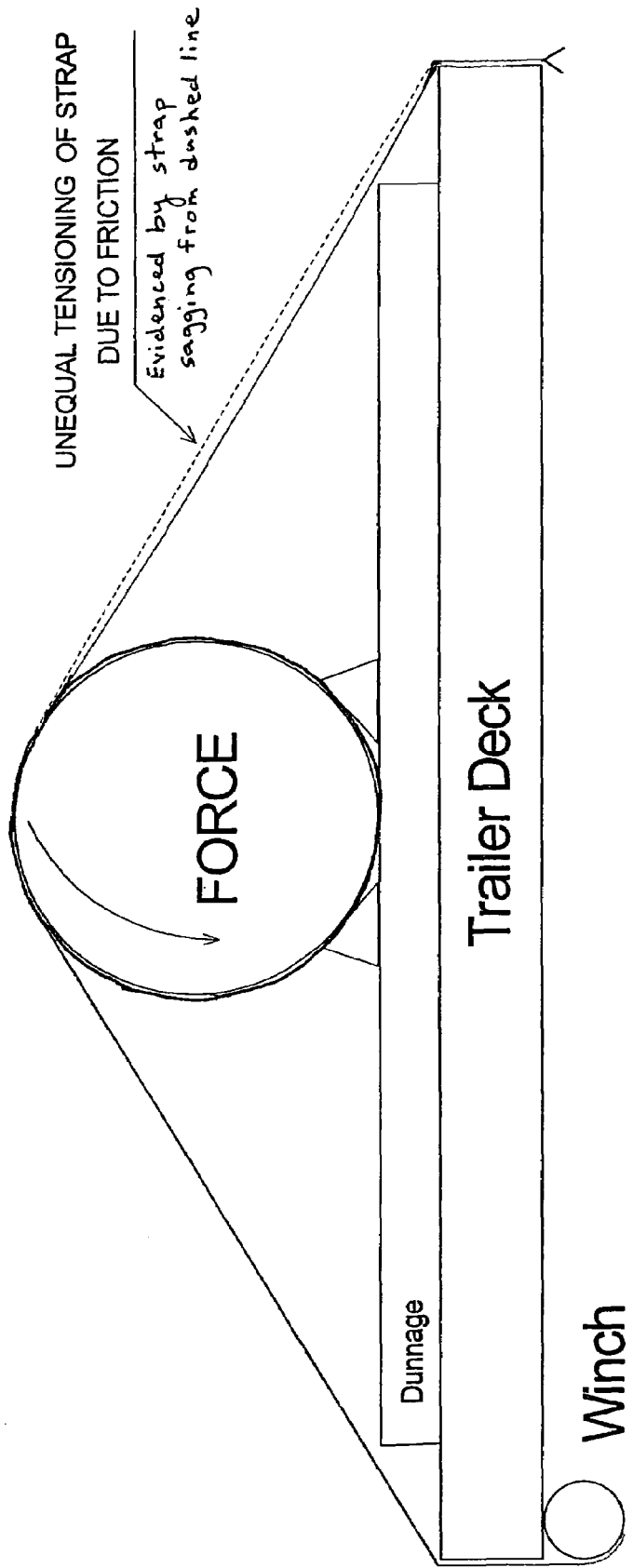
FIG. 2 is a diagrammatic illustration showing a rear elevation view of a single item load secured to a trailer deck in accordance with a conventional line-wrapped-around-entire-load approach.
Figure 3A:
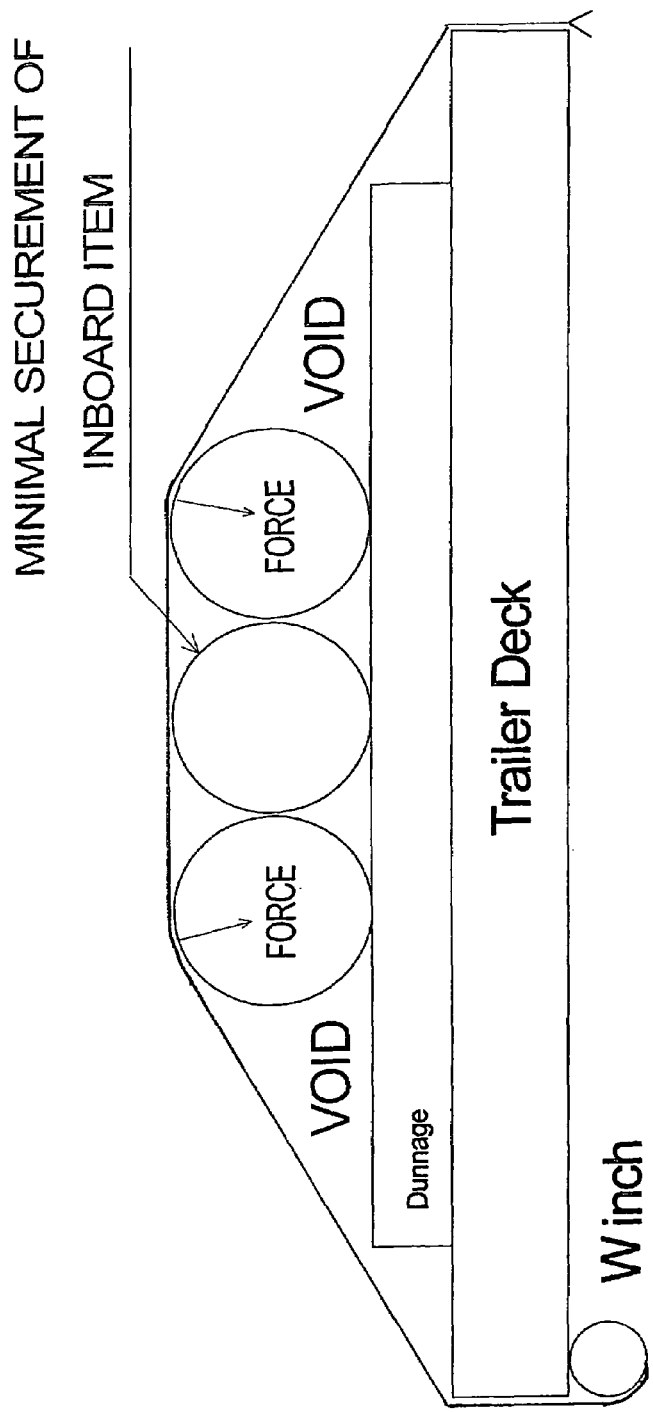
FIGS. 3A and 3B are diagrammatic illustrations showing rear elevation views of multiple item single layer loads secured to a trailer deck in accordance with a conventional line-over-top-of-load securing approach.
Figure 3B:
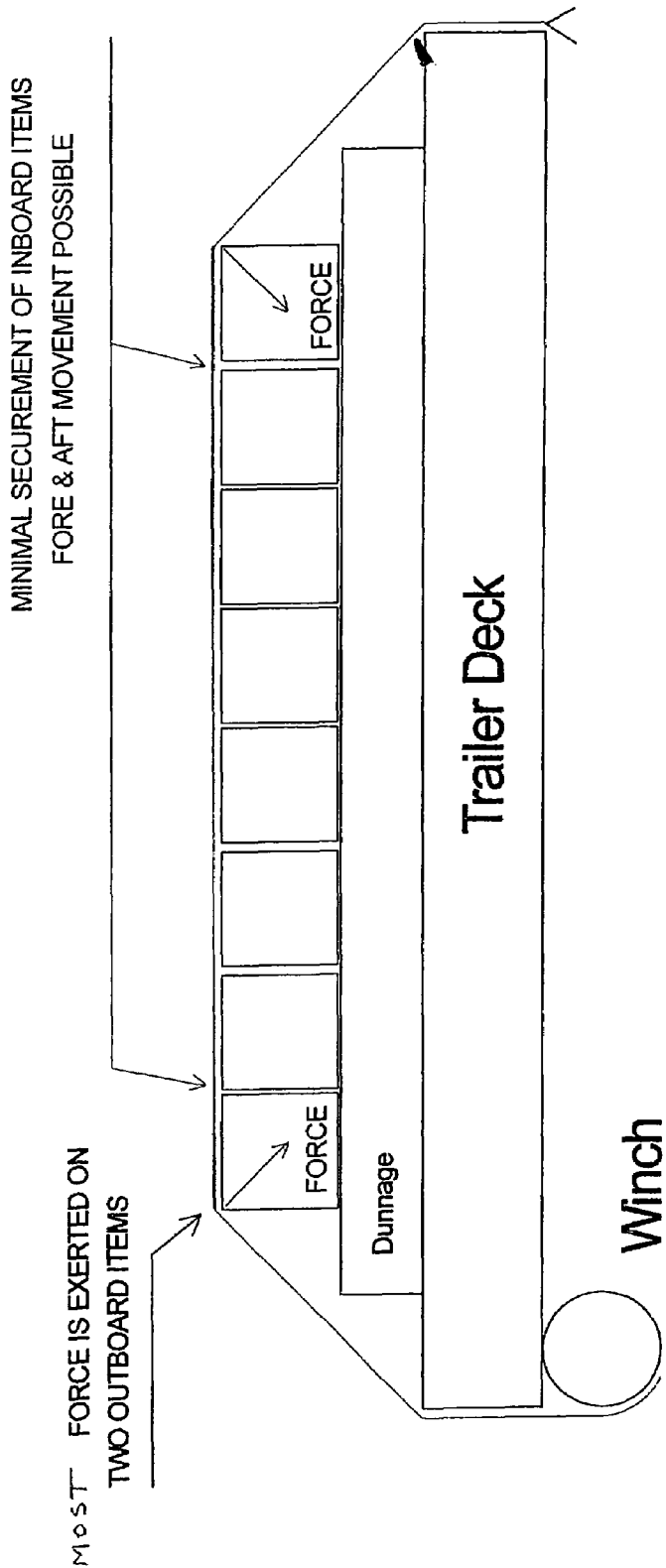
Figure 4:
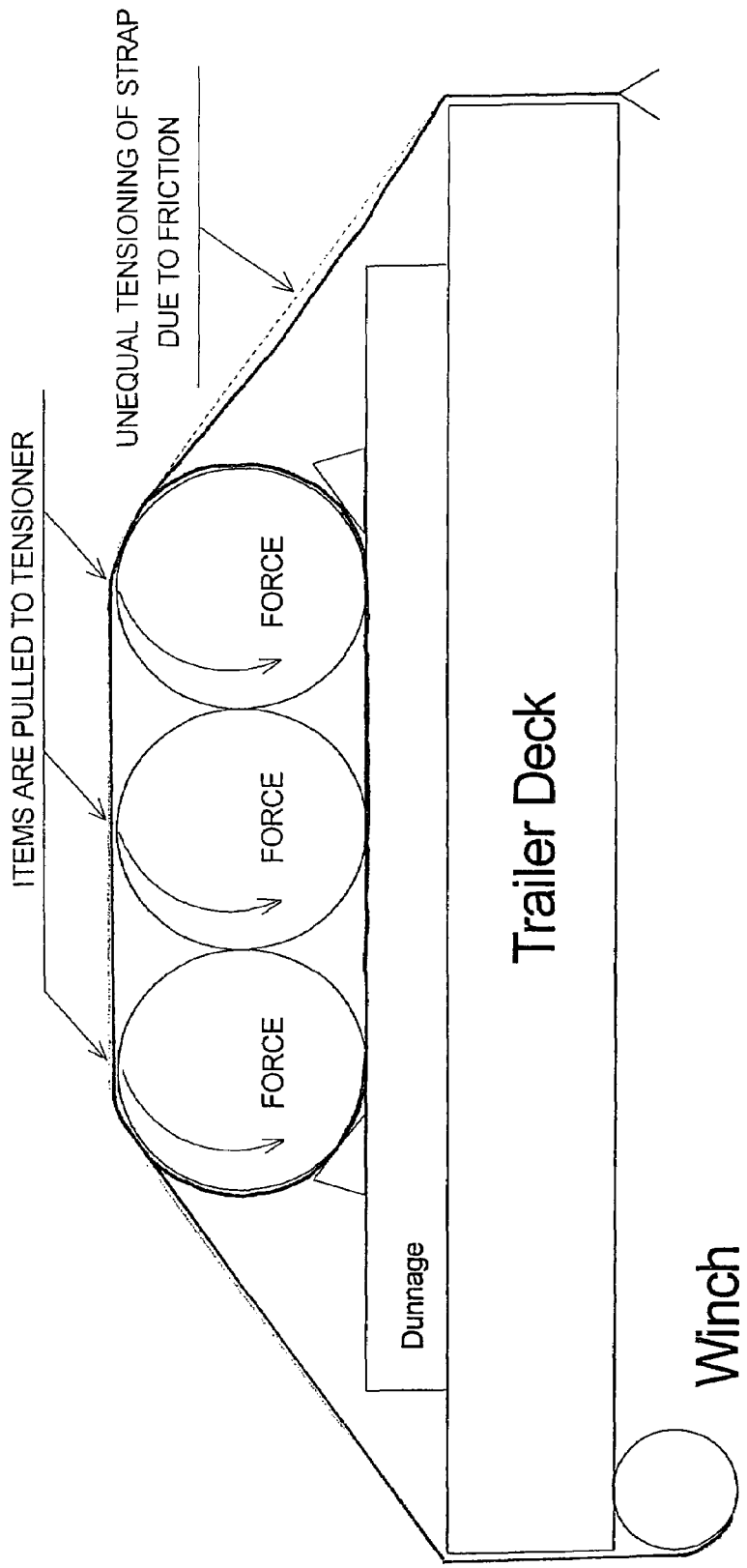
FIG. 4 is a diagrammatic illustration showing a rear elevation view of a multiple item single layer load secured to a trailer deck in accordance with a conventional line-wrapped-around-entire-load securing approach.
Figure 5:
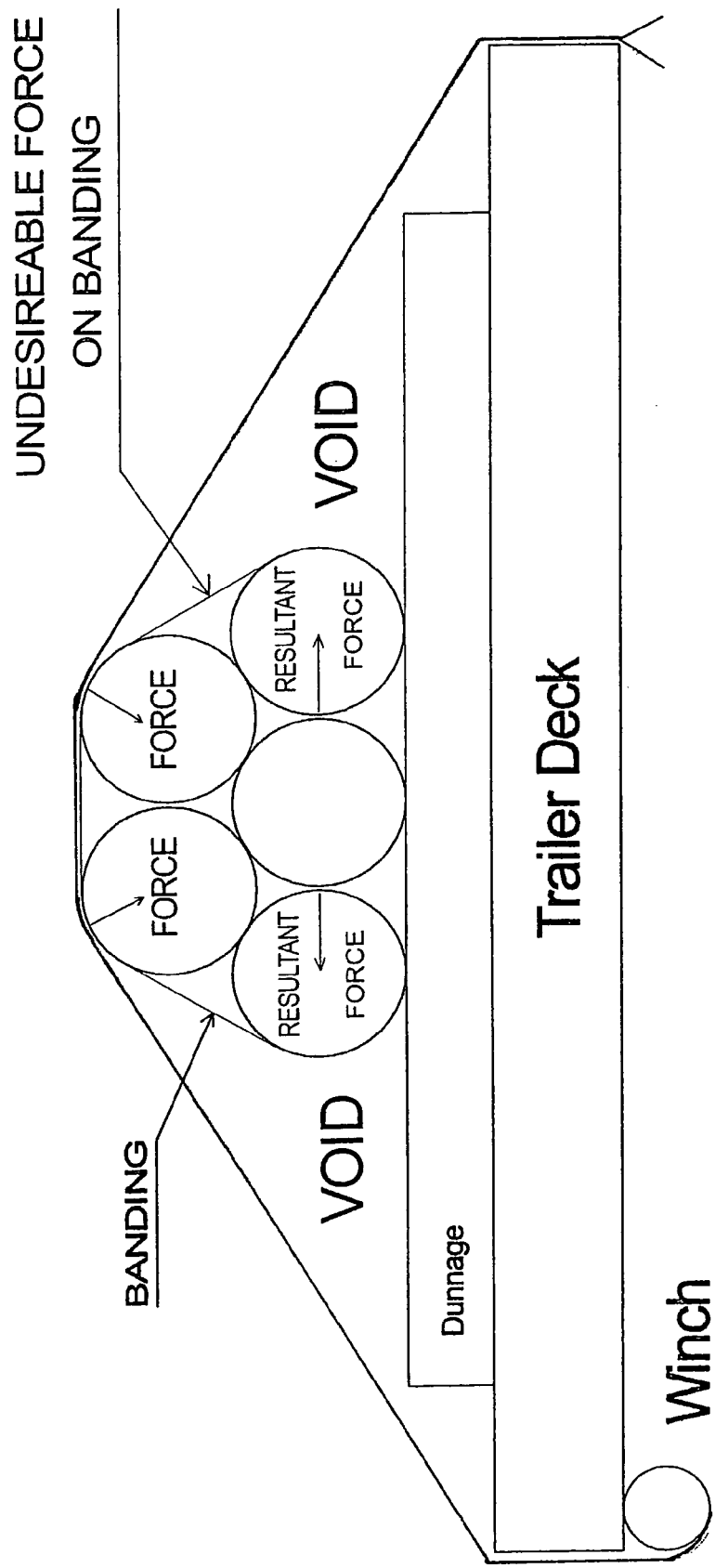
FIG. 5 is a diagrammatic illustration showing a rear elevation view of a multiple item stacked layer load secured to a trailer deck in accordance with a conventional line-over-top-of-load securing approach.
Figure 6:
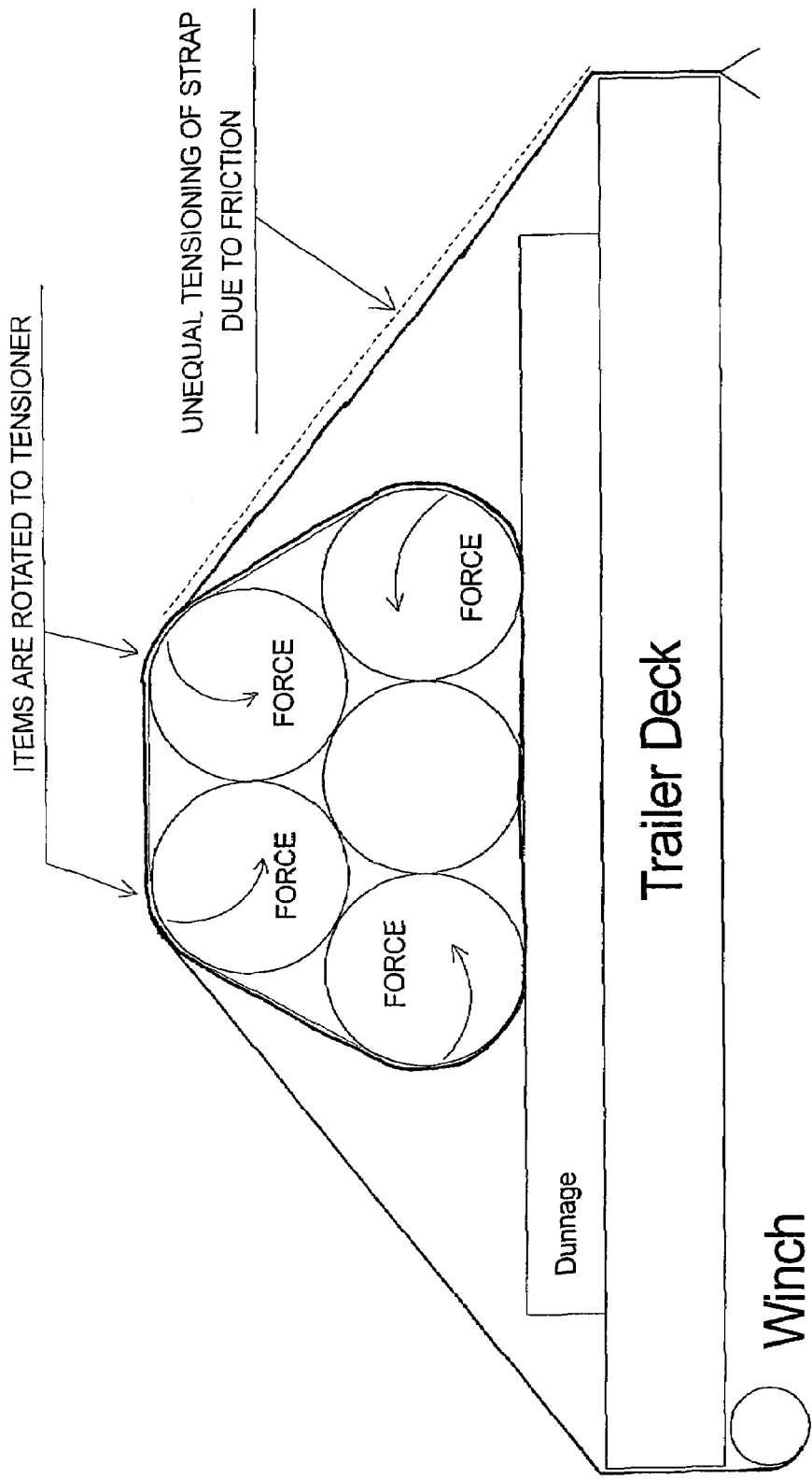
FIG. 6 is a diagrammatic illustration showing a rear elevation view of a multiple item stacked layer load secured to a trailer deck in accordance with a conventional line-wrapped-around-entire-load securing approach.
Figure 7A:
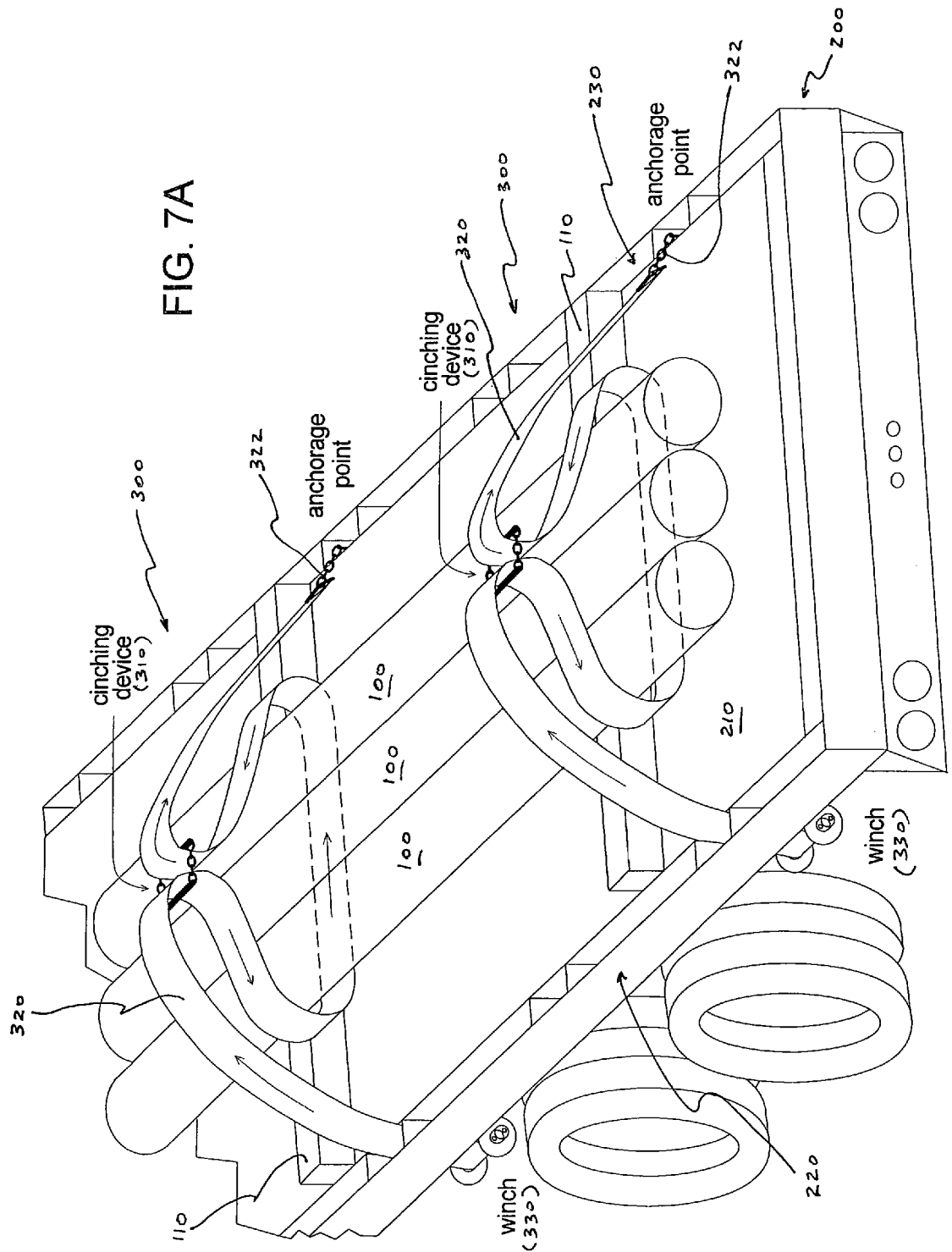
Figure 8:
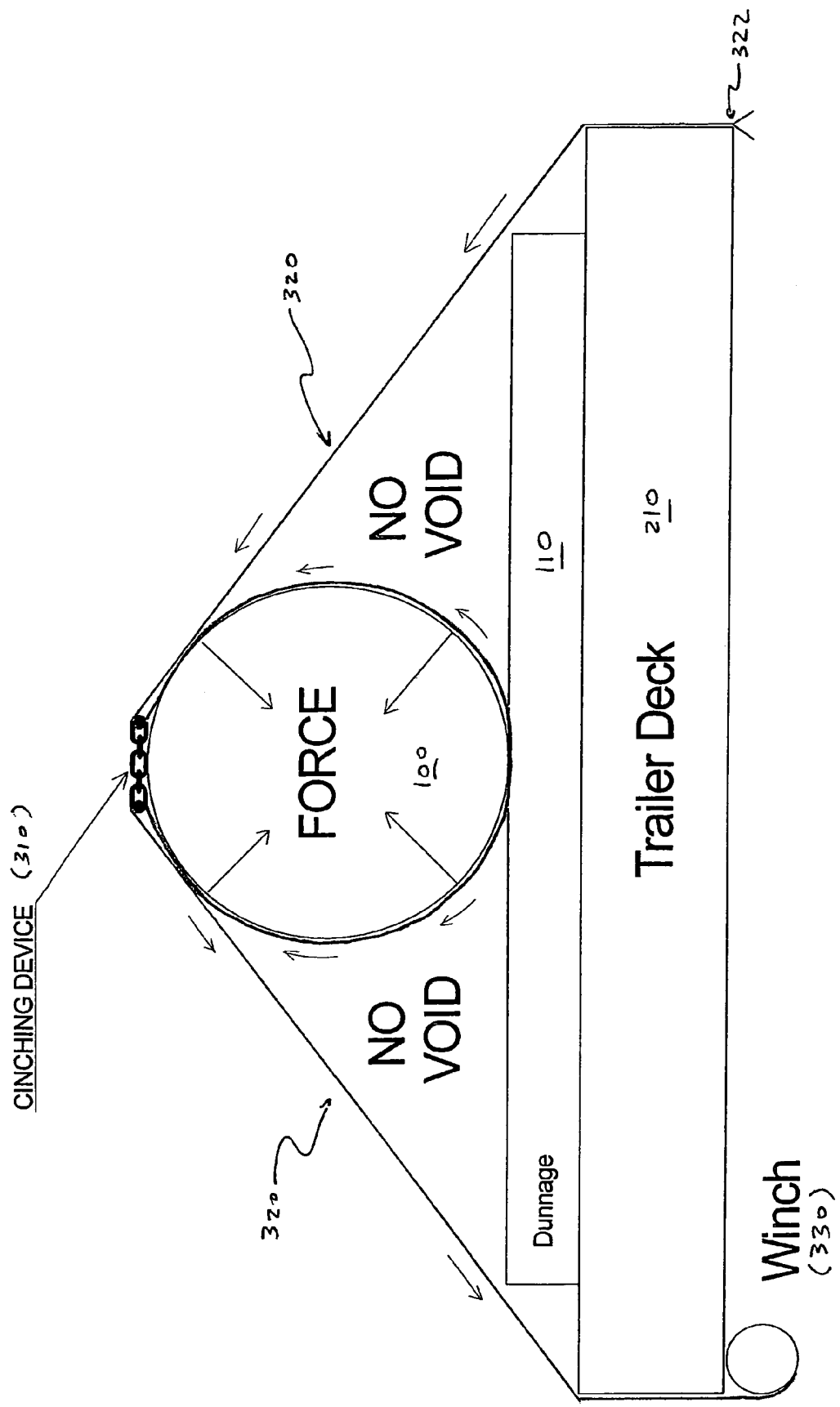
FIGS. 8-12 are diagrammatic illustrations showing rear elevation views of various types of loads secured to the deck of a trailer by exemplary cargo securing systems in accordance with aspects of the present inventive subject matter.
Figure 9:
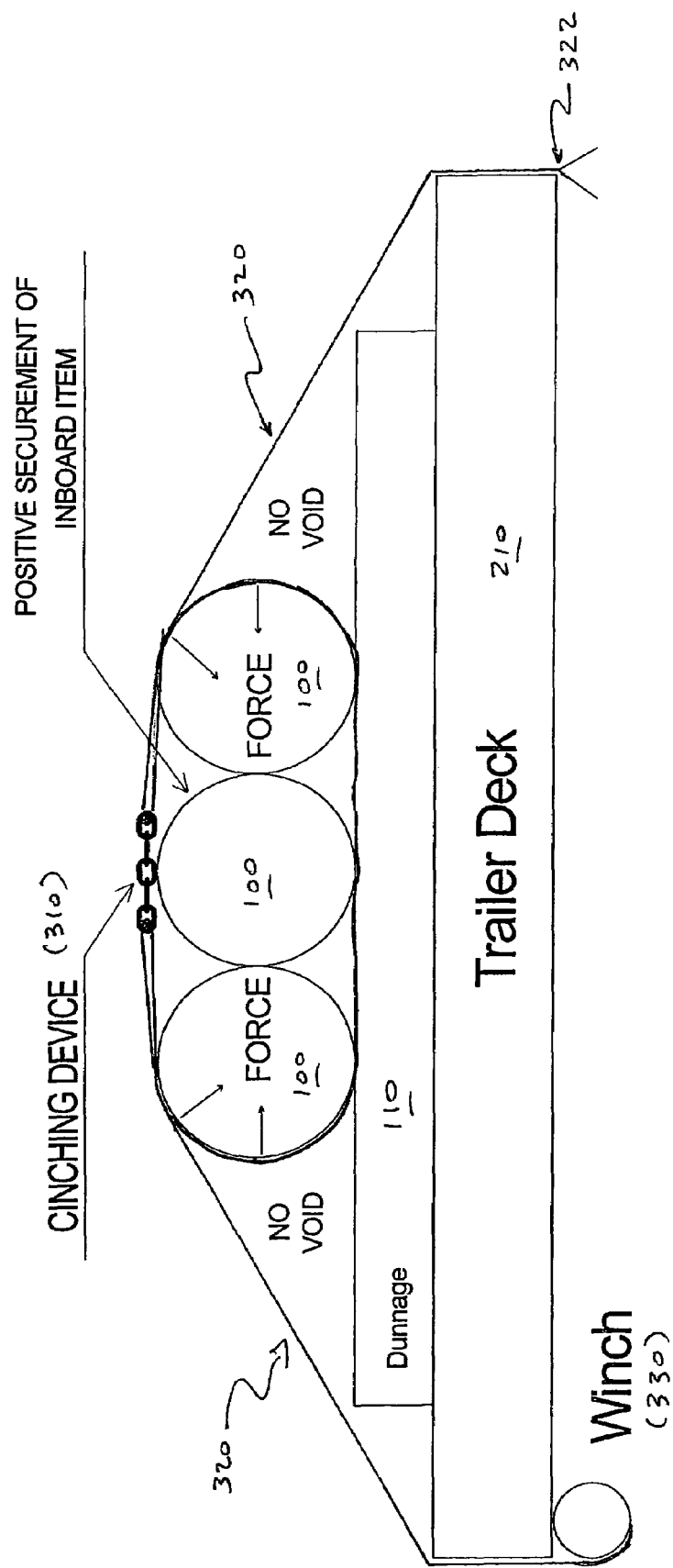
Figure 10:
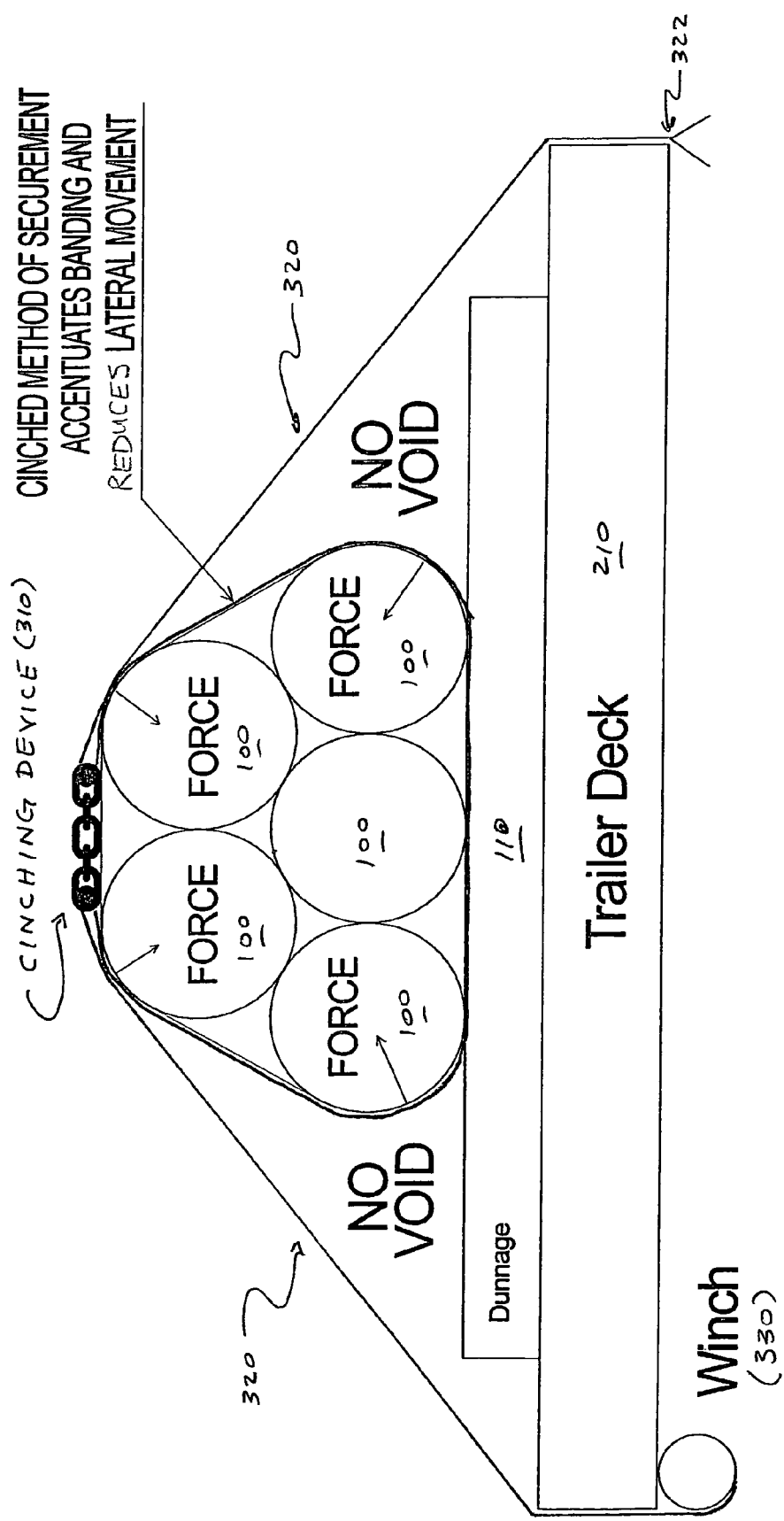
Figure 11:
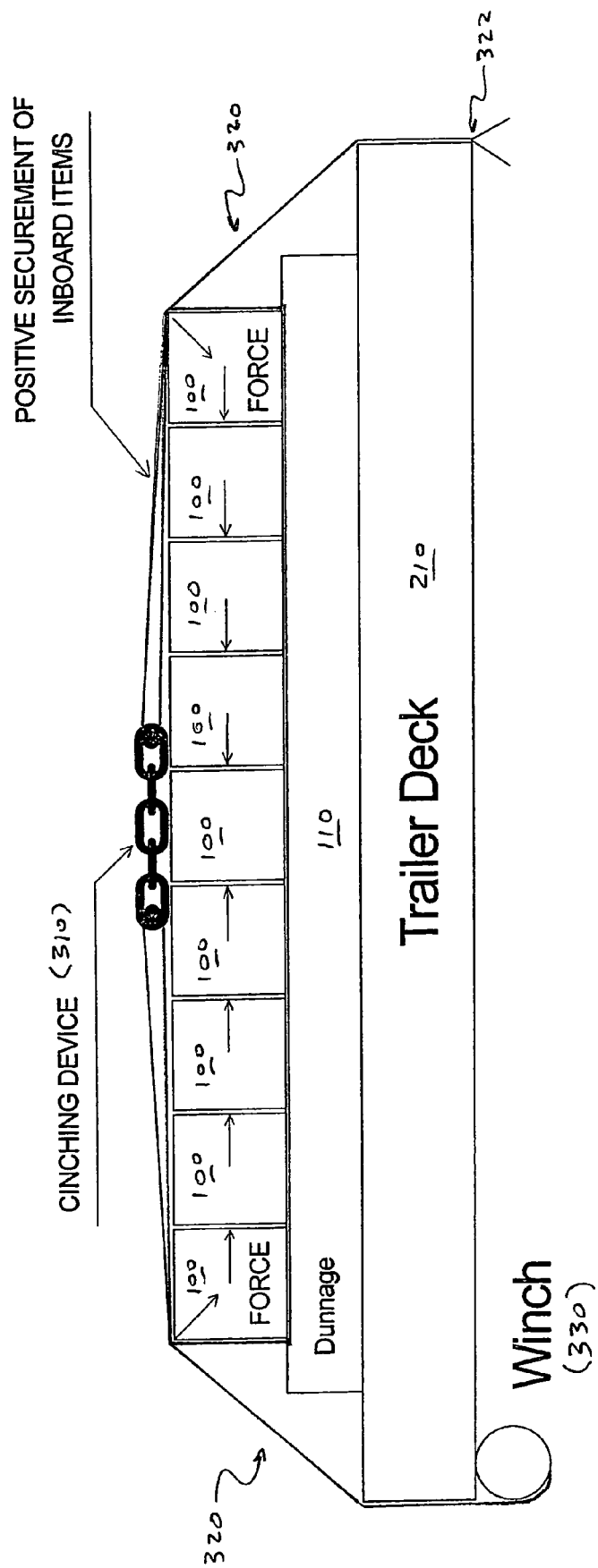
Figure 12:
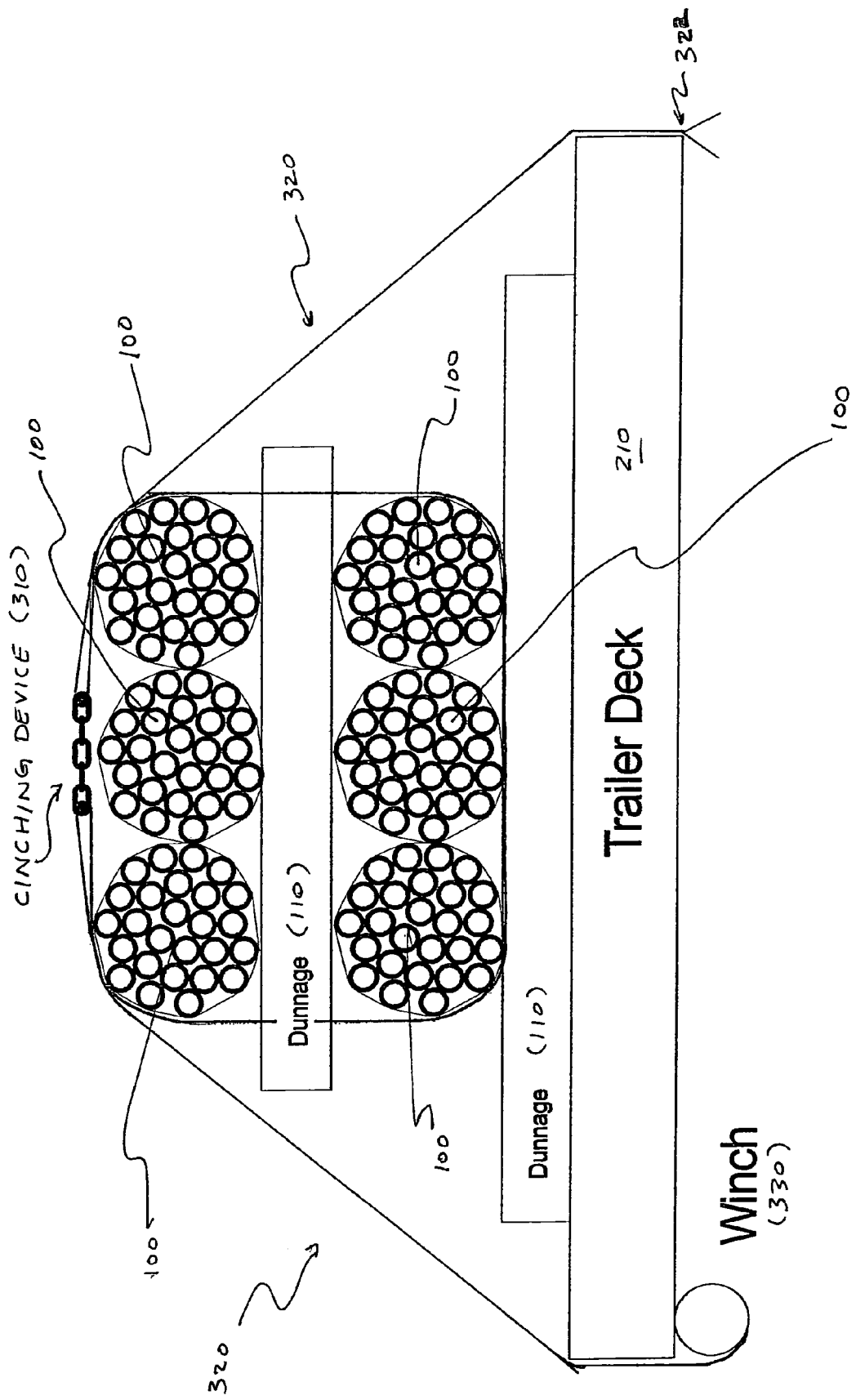
Figure 13:
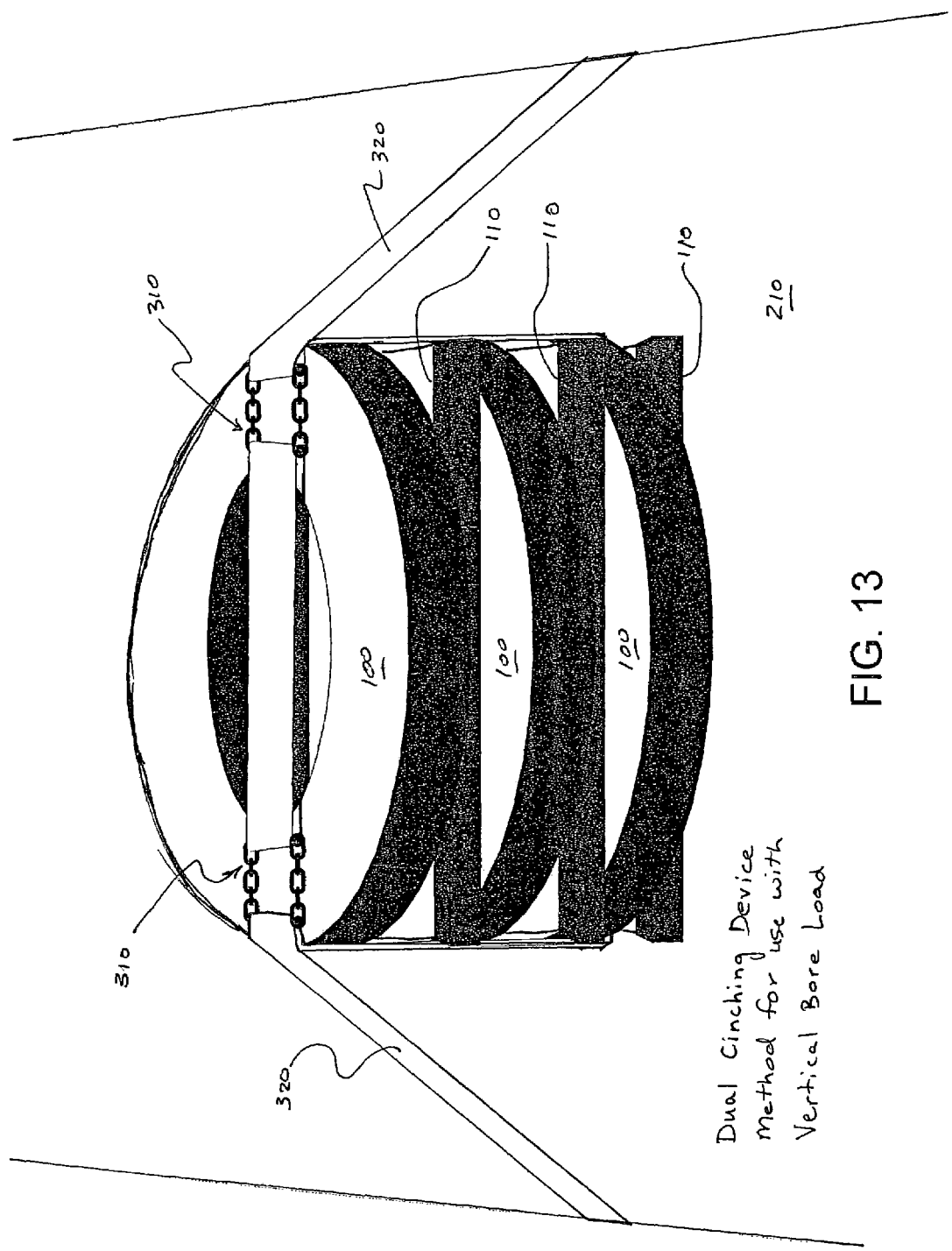
FIG. 13-15 are diagrammatic illustrations showing partial perspective views of various types of loads secured to the deck of a trailer by exemplary cargo securing systems in accordance with aspects of the present inventive subject matter.

With reference to FIGS. 7A and 7B, a multiple item single layer load 100 is shown being secured to the deck 210 of a trailer 200 by one or more cooperating cargo securing systems 300 (two being shown here for simplicity and clarity of the present description). Each system 300 includes: a cinching device 310, a substantially flexible tie down line 320, and a tensioning device or winch 330. The line 320 shown is a wider flat strap type suitably made of nylon or other material as is known in the art. Of course, other line types are alternately employed, e.g., including but not limited to: ropes, cords, chains, wire cables, synthetic webbing, or the like.

Suitably, the winch 330, as is known in the art, is attached to one side 220 of the trailer 200. The line 320 is attached at a first end to the winch 330 so as to be selectively wound and unwound therefrom. The leading end 322 of the line 320 opposite the first end is generally free to be extended from or retracted toward the winch 330 and typically has a hook or the like arranged thereon.

When securing the load 100, the line 320 extends from the winch 330 on side 220 of the trailer 200, through the cinching device 310, around the load 100, back through the cinching device 310, and to the side 230 of the trailer 200 opposite side 220 where the leading end 322 of the line 320 is anchored, e.g., via the hook arranged thereon. As shown, the load 100 optionally rests upon dunnage 110 arranged on the deck 210 of the trailer 200. FIG. 7A shows the line 320 essentially untensioned. Operating the winch 330 so as to wind the line 320 thereon tightens the line 320 thereby constricting it about the load 100 (i.e., providing direct securement) and securing the load 100 to the deck 210 of the trailer 200 (i.e., providing indirect securement), as seen in FIG. 7B.

Figure 14:
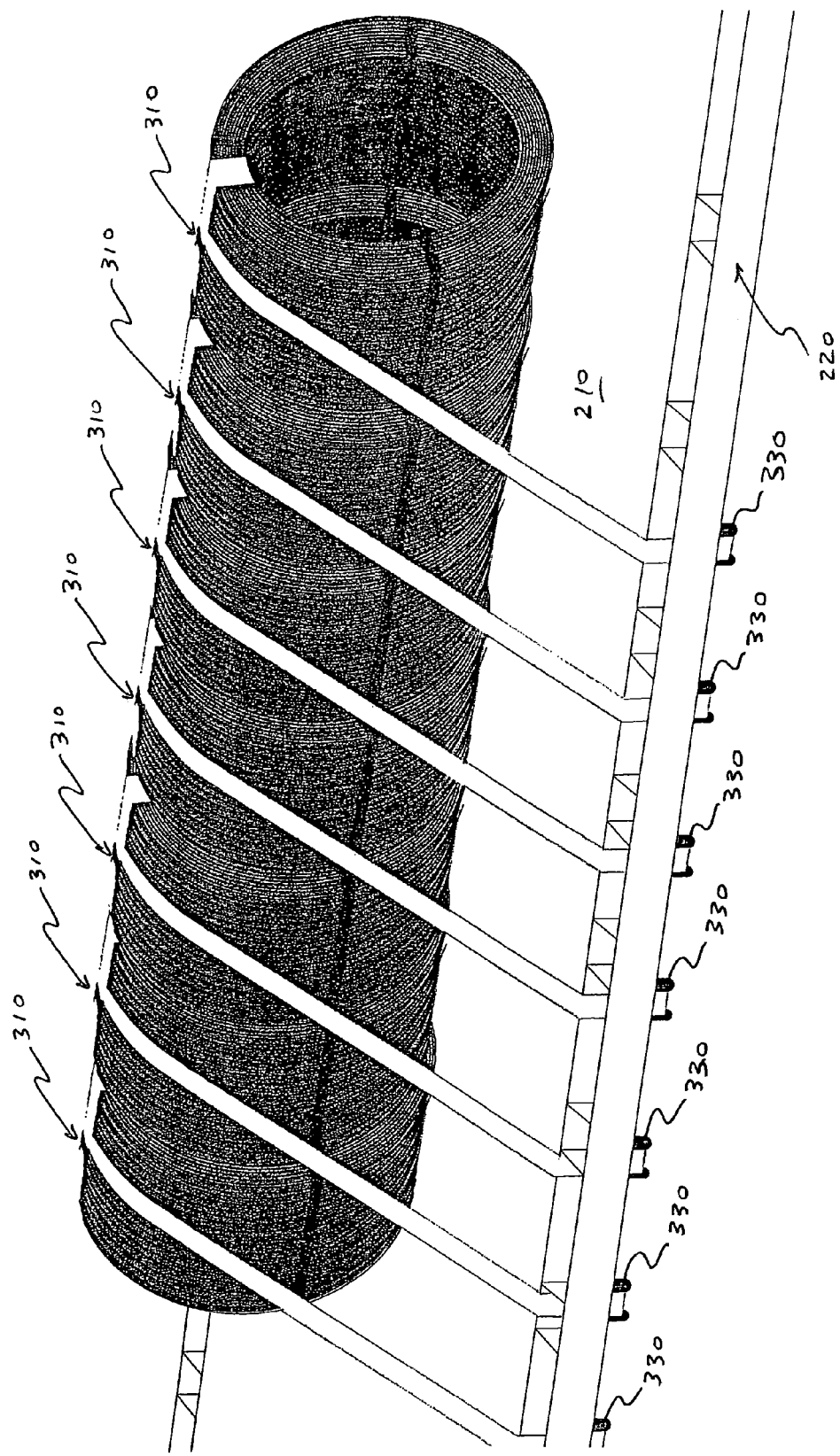
Figure 15:
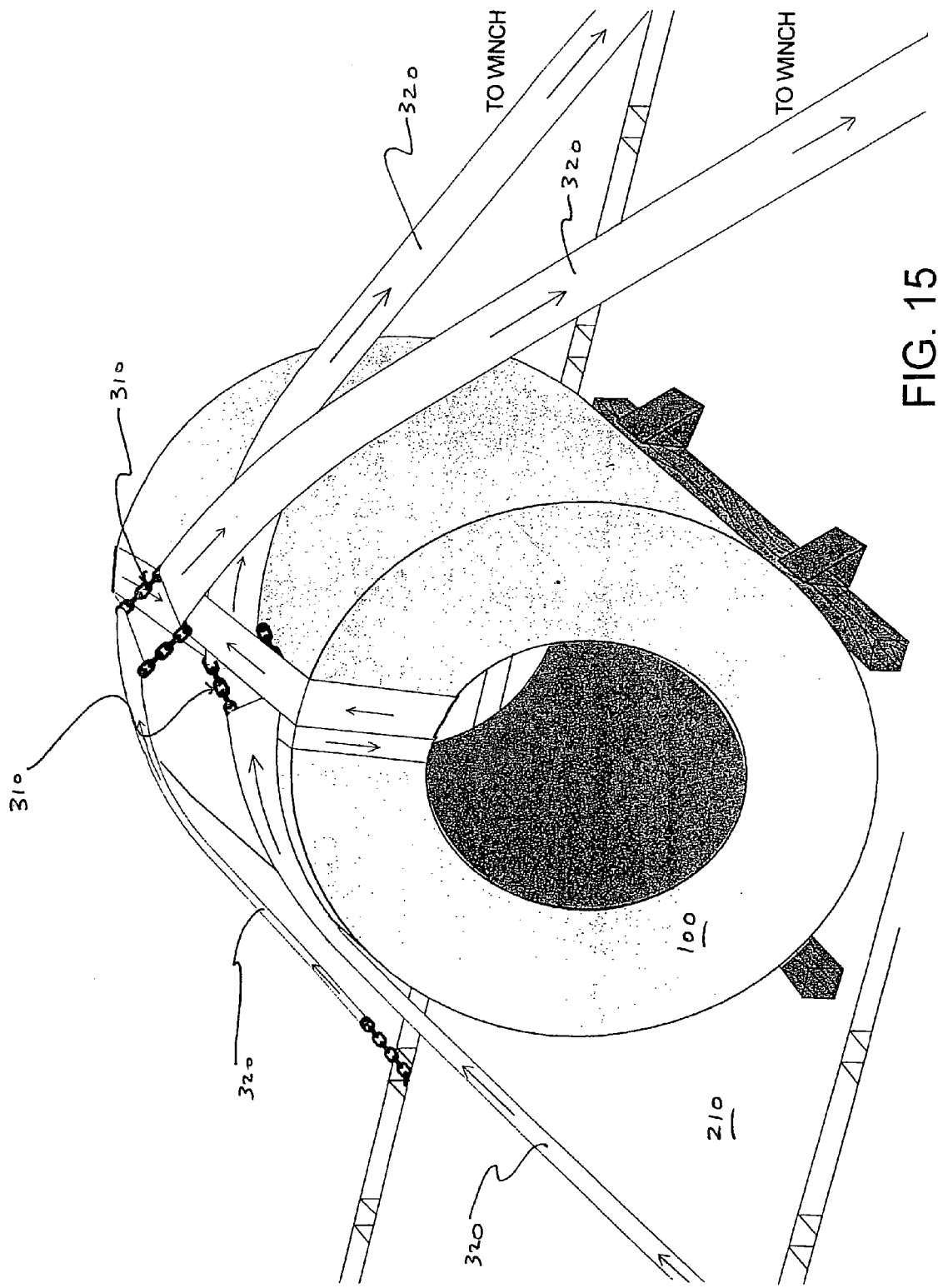
Figure 16:
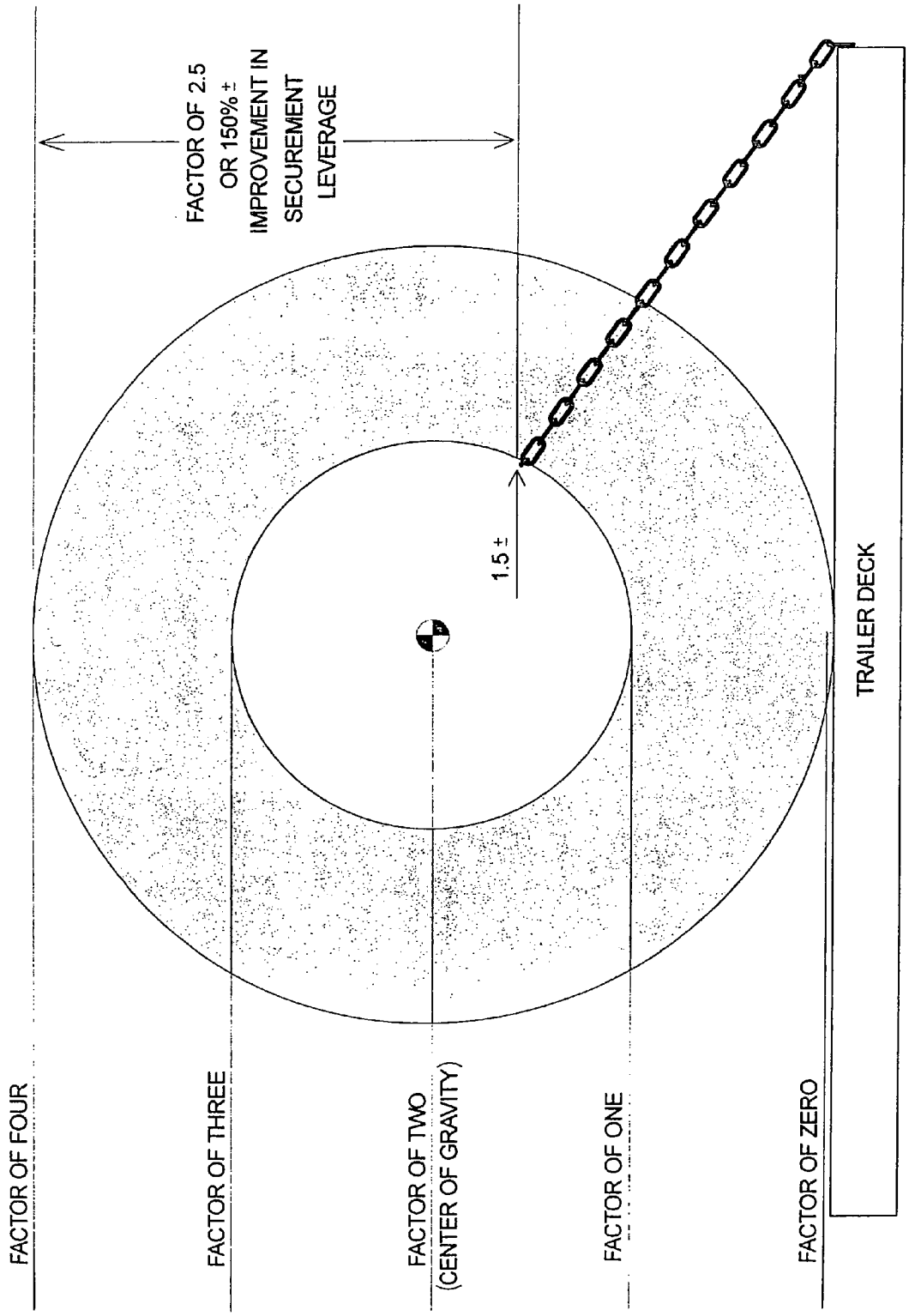
FIG. 16 is a diagrammatic illustration showing a rear elevation view of a hollow load secured to a trailer deck in accordance with a conventional securing approach.

FIGS. 8-15 show the cargo securing system 300 being used in different variations of the same basic configuration to secure various different types of loads 100. For example, as shown in FIG. 15, the winch 330 and the anchoring point for the leading end 322 of the line 320 connected thereto are on the opposite sides of the trailer 200, yet are diagonally situated. For annular loads 100 having hollow centers (e.g., wire coils, rolls of metal, etc.), the lines 320 optionally pass through the hollow centers as shown in FIGS. 14 and 15. However, the lines 320 are still wrapped around a portion of the annular ring to constrict thereabout. Also, in FIGS. 14 and 15, inward radial compression is achieved on the load 100, outside the normal plane of operation. Of particular note, as compared to a conventional load securing approach depicted in FIG. 16, the configuration of FIG. 15 additionally provides an improvement in securement leverage of approximately 150%.

Suitably, the system 300 minimizes undesired friction, bunching, chafing, binding and/or pinching of the line 320 during tensioning while still advantageously providing radially inward constricting securement of the load 100. Various features and/or aspects of the present system 300 aid in achieving the foregoing. For example, dunnage 110 is optionally used to raise the load 100 off the deck 210 permitting the lines 320 to move freely therebetween. Additionally, the cinching device 310 also aids in achieving the foregoing.

FIGS. 17-23 show suitable embodiments of the cinching device 310 which includes a pair of substantially rigid mandrels 312 arranged at opposing ends 314 and 316 joined together by a linking portion 318. Suitably, the mandrels 312 are constructed from steel, titanium, composite plastics or carbon fiber materials, or other materials as are known in the art that are sufficiently strong to provide proper working load limits. In the case of use with flammable or explosive cargo, non-ferrous metals (e.g., aluminum, brass, bronze, etc.) or other non-ferrous materials may be employed. When in use, the line 320 passes over and/or partially around each mandrel 312 which provides an engagement point therefor. That is to say, each mandrel 312 receives the line 320 and provides a point about which the direction of the line 320 is essentially reversed or otherwise changed. As the line 320 is wound onto the winch 330 or otherwise pulled tight, the mandrels 312 permit the line 320 to slide, rotate and/or otherwise traverse around themselves with minimal impedance. Accordingly, even tensioning of the line 320 on both sides of the load 100 is not hampered.

Suitably, to provide conformance to a surface of the load 100 upon which it is in contact when the cinching device 310 is used to secure the load 100, the ends 314 and 316 are joined by a substantially flexible linking portion 318 such that they may move at least partially independent of one another with respect to one or more degrees of freedom. See, for example, FIGS. 17 and 19 wherein the linking portion 318 includes a pair of laterally spaced apart chains 318a and 318b that are joining the respective ends of the mandrels 312 together; and FIGS. 20-22 wherein the linking portion 318 includes a single chain link 318c that joins opposing ends 314 and 316 of the cinching device 310. Of course, other flexible linking portions are also contemplated, e.g., ropes, wire cables, cords, webbing or straps made of nylon or another suitable material, etc.

Figure 17:
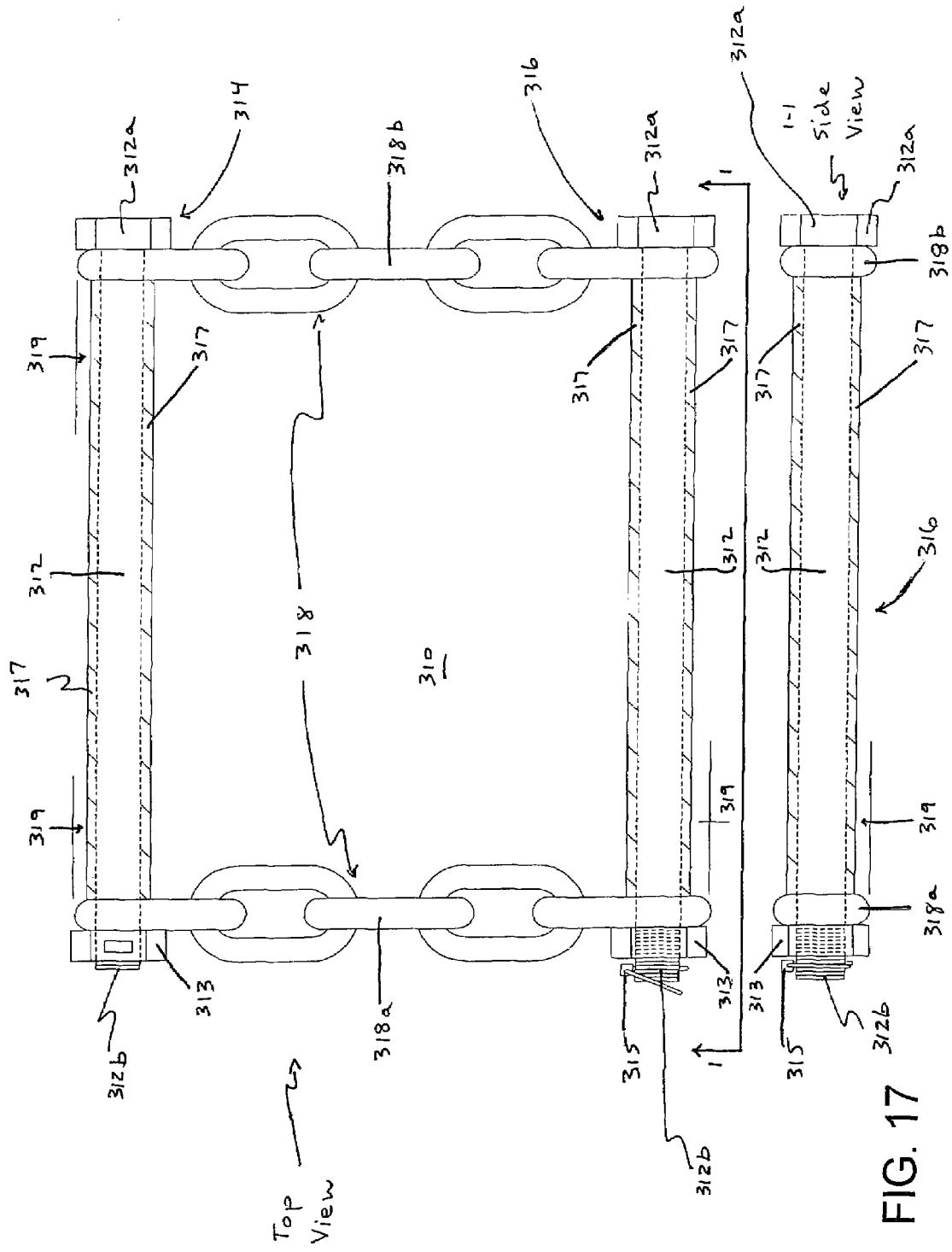
FIG. 17 is a diagrammatic illustration showing a top plan view and a side elevation view taken along section line 1-1 of an exemplary cinching device in accordance with aspects of the present inventive subject matter, with selected internal structures being depicted via dashed lines.
Figure 18:
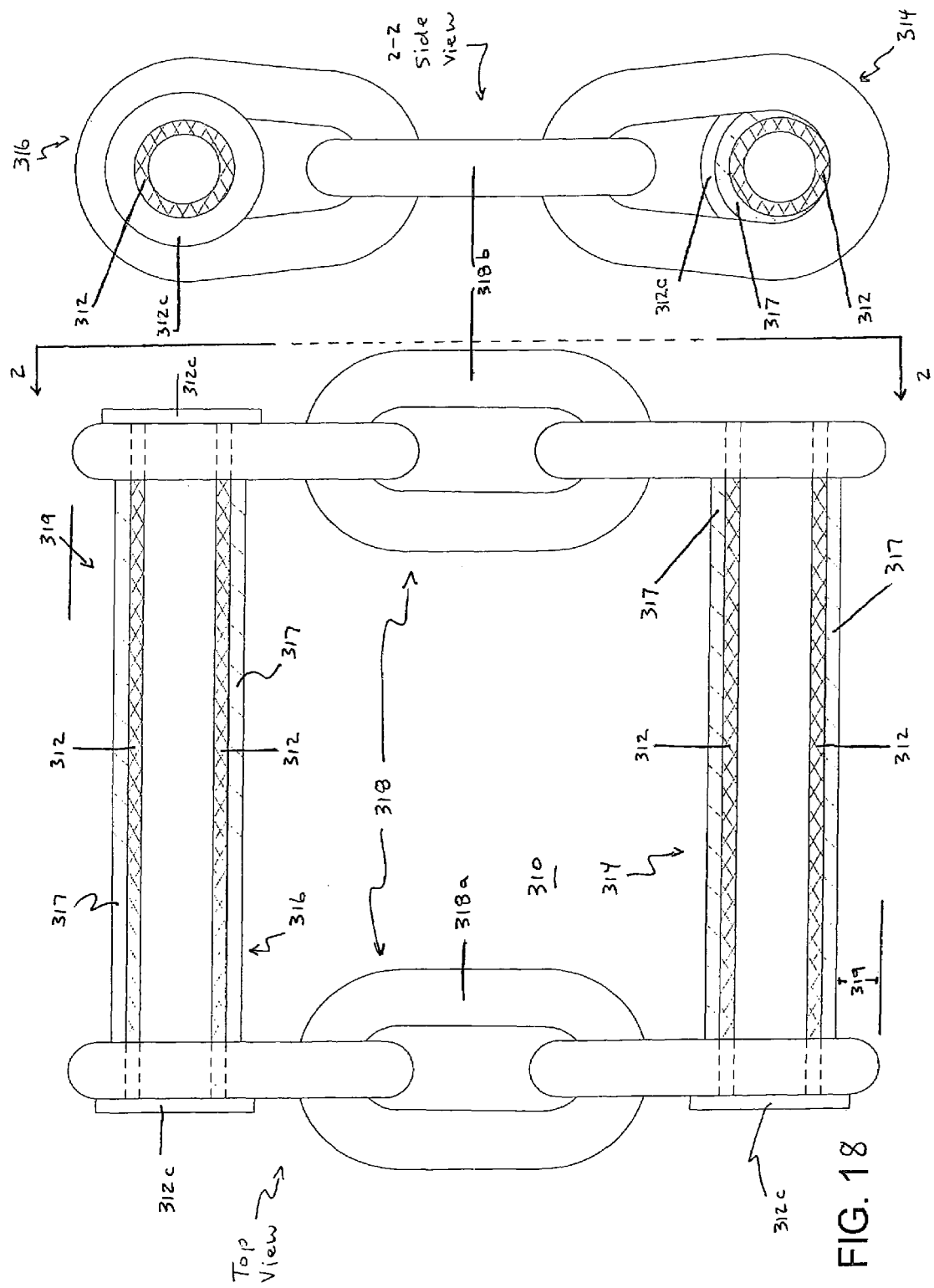
FIG. 18 is a diagrammatic illustration showing a top plan view and a side elevation view taken along section line 2-2 of another exemplary cinching device in accordance with aspects of the present inventive subject matter, with selected internal structures being depicted via dashed lines and one end cap omitted to expose certain internal features.

Referring to FIG. 17, in one embodiment of the cinching device 310, the mandrels 312 are solid bolts including a bolt head end 312a and an opposing threaded end 312b. The mandrels 312 are attached to the chains 318a and 318b by extending the threaded ends 312b through end links of the chains 318a and 318b, then applying nuts (e.g., lock, nyloc, or other suitable types) 313 to the threaded ends 312b. Optionally, a lynch, hair or cotter pin 315 is used to guard against the nuts 313 unscrewing. It is to be appreciated that the bolt head ends 312a and the nuts 313 are dimensioned so as to not be able to pass through the end links of chains 318a and 318b. FIG. 18 illustrates a similar embodiment except that the mandrels 312 are hollow heavy-walled pipes with retaining collars or end caps 312c welded, press fit or otherwise attached to opposing ends to retain the end links of the chains 318a and 318b on the mandrels 312.

Figure 19:
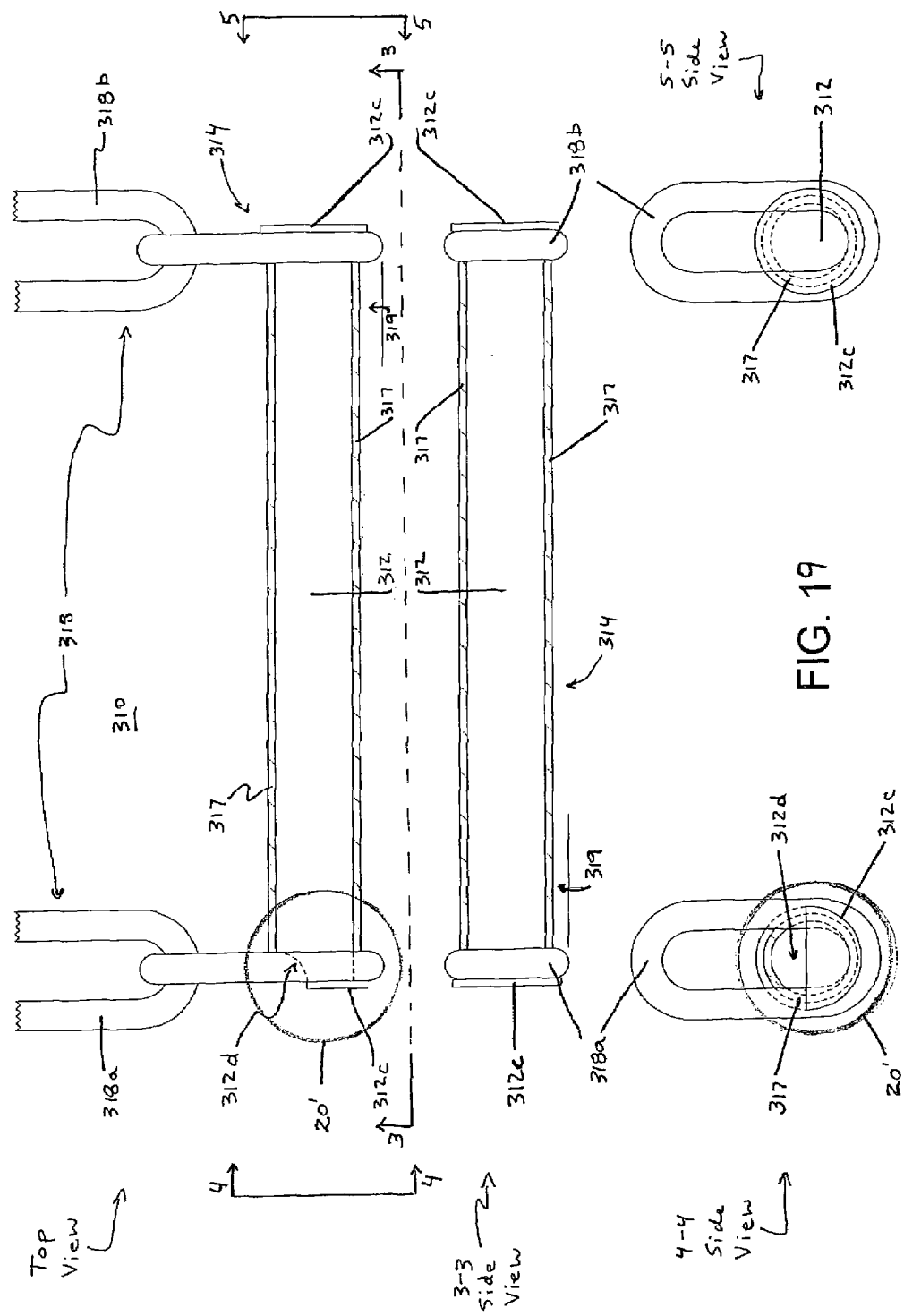
FIG. 19 is a diagrammatic illustration showing a partial top plan view and side elevation views taken along section line 3-3, 4-4 and 5-5, respectively, of another exemplary cinching device in accordance with aspects of the present inventive subject matter, with selected internal structures being depicted via dashed lines.

FIG. 19 shows an alternate embodiment of the cinching device 310 shown in FIG. 18. In particular, the mandrels 312 are solid rods with integrally formed retaining collars or end caps 312c. As best seen in detail 20', a cut out portion or recess 312d is formed in one or more ends of the mandrels 312 such that one dimension of an end cross-section of the mandrel 312 is smaller than the end link's opening while a second dimension of the same end cross-section is larger than the end link's opening. Accordingly, when the mandrel 312 is selectively rotated with respect to the end link through which it is inserted, such that the recess 312d is aligned with the link (i.e., 90 degrees rotated with respect to what is shown in FIG. 19), the end link is able to shift or otherwise move over into the recess 312d such that it may be removed over the end of the mandrel 312; and, when the mandrel 312 is selectively rotated with respect to the end link through which it is inserted, such that the recess 312d is not aligned with the link (i.e., as shown in FIG. 19), the end link is not able to shift or otherwise move over into the recess 312d such that it may not be removed over the end of the mandrel 312. Suitably, once the load 100 is secured, the tension on the line 320 keeps the mandrels 312 from rotating to a degree which would permit their detachment from the chains 318a and 318b. Suitably, as shown, the cutout portion or recess 312d is formed to be concave in shape. However, alternately, the cutout portion or recess 312d may be formed to be convex or linear in shape or have any other suitable shape.

With respect to FIGS. 17-19, suitably, the mandrels 312 are free to rotate or otherwise move within the openings of the end links through which they pass, subject to the retention imposed by the bolt head ends 312a, nuts 313 and/or retaining collars or end caps 312c. The rolling movement of the mandrels 312 in this respect serves to reduce the potential for undesired friction, bunching, chafing, binding and/or pinching of the line 320 during tensioning or as the line 320 is otherwise drawn around the mandrels 312. Of course, optionally the mandrels 312 may be affixed to the chains 318a and 318b, e.g., by welding them to end links or the like.

As an additional measure, sheaths 317 (e.g., made of Teflon® or another like stiff plastic or other appropriate polymer material as is known in the art or a knurled steel or the like) are optionally provided over the mandrels 312. Suitably, the sheaths 317 are free to rotate about the mandrels 312 (particularly in the case where the mandrels 312 are affixed to the chains 318a and 318b) to promote or further enhance the reduction of potential for undesired friction, bunching, chafing, binding and/or pinching of the line 320. Additionally, the outer diameters of the sheaths 317 are suitably sized so as to be larger than an inner dimension of the end link openings, and they suitably extend substantially the entire length of the mandrels 312 (i.e., excluding the widths of the end links). Accordingly, the sheaths 317 further serve to retain the end links of the chains 318a and 318b at the ends of the mandrels 312.

When used in connection with a strap type line 320, it is to be appreciated that lengths of the mandrels 312 are suitably made to accommodate the width of the line 320 or they may be longer to accommodate angular operation, e.g., as shown in FIGS. 14 and 15. Additionally, the dimensions of clearances 319 are suitably larger than the thickness of the lines 320. Accordingly, when the line 320 is wrapped around the mandrels 312 and the cinching device 310 is pulled tight against the load 100, the line 320 is not pinched between the mandrels 312 and the load surface, i.e., the clearances 319 provide or otherwise leave room for the line 320 to move substantially uninhibited between the load 100 and the mandrels 312.

Figure 20:
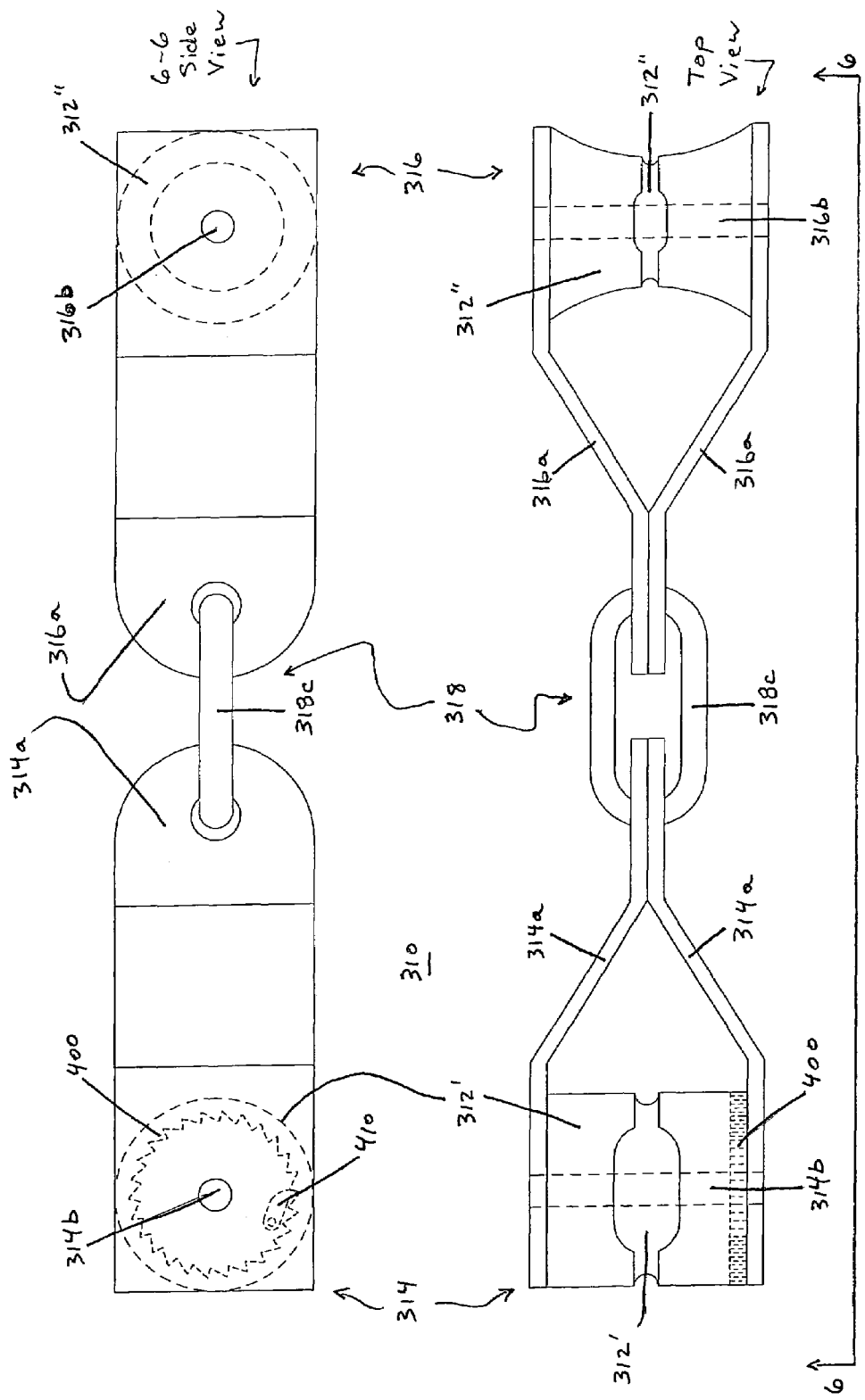
FIG. 20 is a diagrammatic illustration showing a top plan view and a side elevation view taken along section line 6-6 of another exemplary cinching device in accordance with aspects of the present inventive subject matter, with selected internal structures being depicted via dashed lines.

FIG. 20 shows yet another embodiment of the cinching device 310 exhibiting beneficially rolling mandrels 312. The single chain link 318c joins ends 314 and 316 which include forks 314a and 316a, respectively, each holding a corresponding rolling mandrel 312' and 312" on axles 314b and 316b. Suitably, the forks 314a and 316a are constructed from steel, titanium, composite plastics or carbon fiber materials, or other materials as are known in the art that are sufficiently strong to provide proper working load limits. In the case of use with flammable or explosive cargo, non-ferrous metals (e.g., aluminum, brass, bronze, etc.) or other non-ferrous materials may be employed. Optionally, as shown on the rolling mandrel 312' a ratcheting mechanism is provided to selectively permit rolling in one direction (i.e., as shown, in the counter clockwise direction) while inhibiting rolling in the opposite direction (i.e., as shown, in the clockwise direction). The ratcheting mechanism is suitably housed within the rolling mandrel 312' and includes a toothed surface 400 and a pivoting catch 410 biased (e.g., by a spring or gravity) against the toothed surface 400. Suitably, the rolling mandrels 312' and 312" have outer surfaces formed so as to center one or more particular types of lines 320 thereon. As shown, for example, centrally on the outer surfaces, an annular channel is formed to receive lines 320 having substantially round cross sections, e.g., ropes, wire cables, cords, etc. Additionally, as shown, wider depressions formed in the outer surface periodically around the channel accommodate links of chain type lines 320. The otherwise planar cylindrical surface of rolling mandrel 312' still suitably accommodates flat strap type lines 320. Alternately, as shown on the rolling mandrel 312", the outer surface is progressively sloped toward the centrally located channel to bias non-strap type lines 320 toward the center of the mandrel 312" when they are pulled tight about the same.

Figure 21:
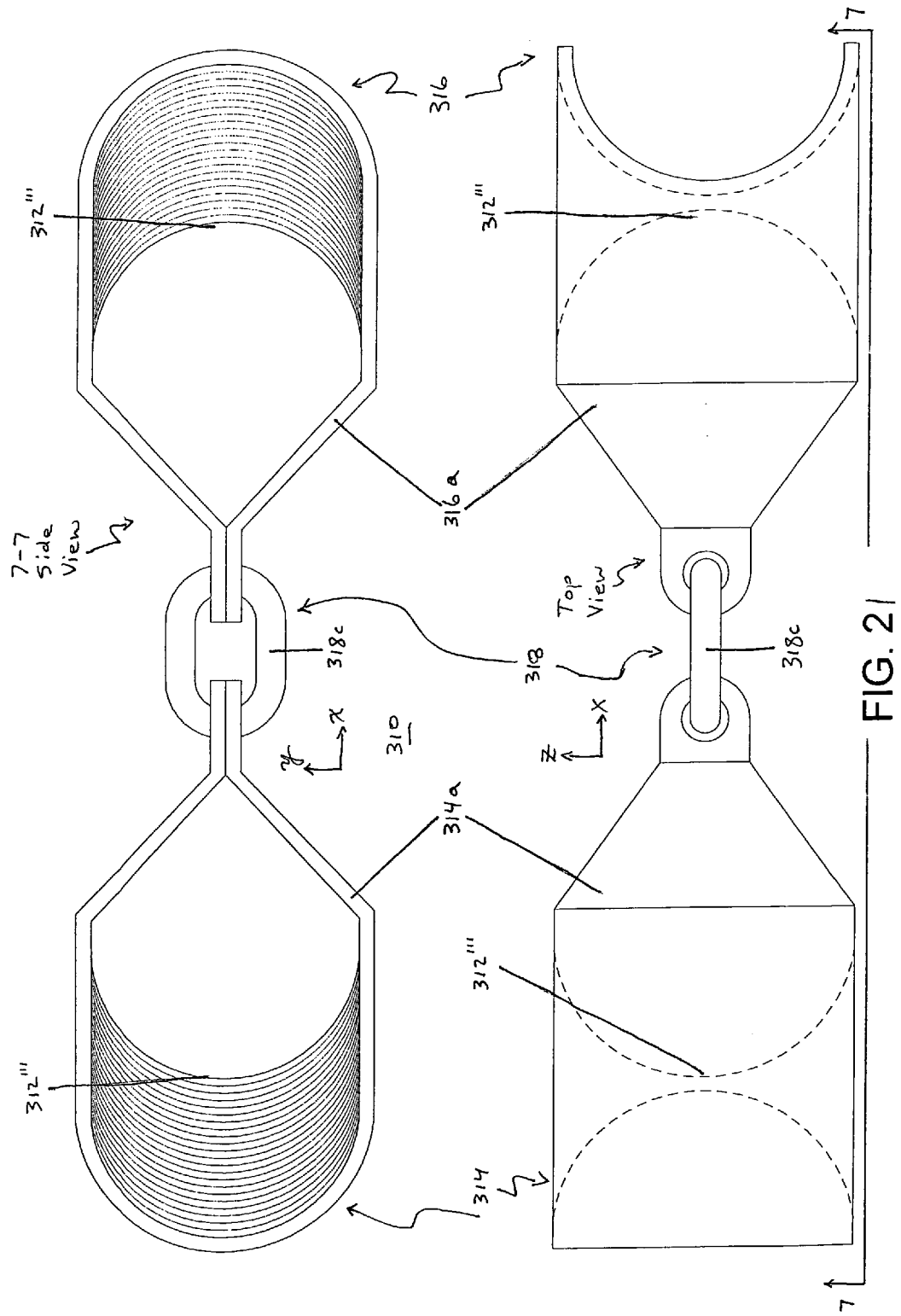
FIG. 21 is a diagrammatic illustration showing a top plan view and a side elevation view taken along section line 7-7 of another exemplary cinching device in accordance with aspects of the present inventive subject matter, with selected internal structures being depicted via dashed lines.

With respect to the embodiment of FIG. 21, the illustrated cinching device 310 has a more simplified construction with the single chain link 318c joining ends 314 and 316 that include forks 314a and 316a, respectively, each having a corresponding non-rolling mandrel surface 312''' integrally formed therewith. Each mandrel surface 312''' is suitably defined as a partial half-pipe that is curved or bent along its longitudinal axis. That is to say, the mandrel surface 312''' can be conceptualized as a surface segment of a toroid corresponding to a partial rotation of a concave curve segment about the axis of the toroid, the curve segment being concave relative to the axis of the toroid. Suitably, the mandrel surface 312" is also symmetrical about two mutually orthogonal bisecting planes, e.g., as shown, the mandrel surface 312" is symmetrical about the x-y plane bisecting it, and it is symmetrical about the x-z plane bisecting it. In this manner, the cinching device 300 realizes a self-aligning characteristic, i.e., the shape of the mandrel surfaces 312''' provide a biasing force which urges the line 320 and/or the mandrel surfaces 312''' to center on one another when the line 320 is pulled tight across the mandrel surfaces 312'''.

Figure 22:
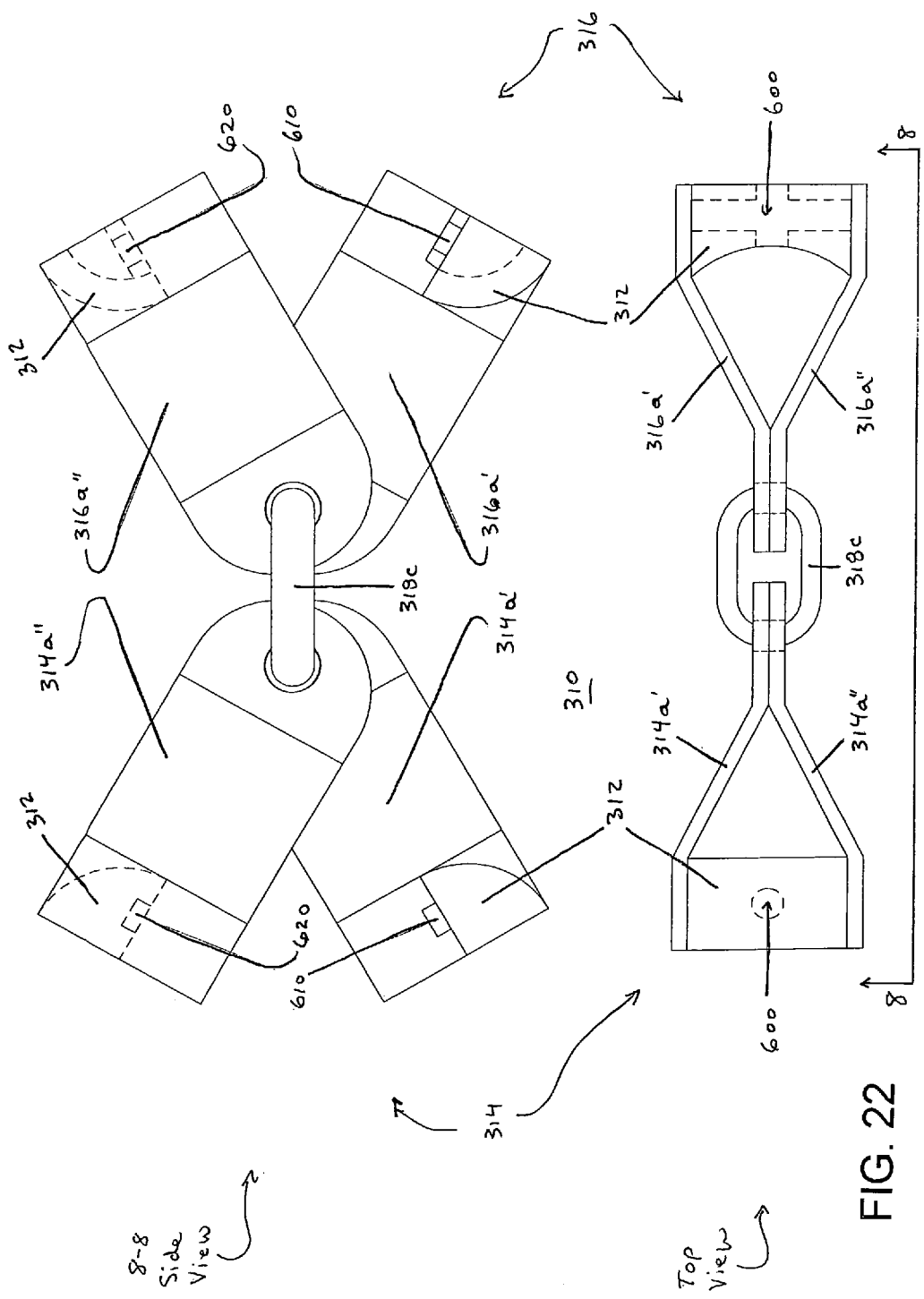
FIG. 22 is a diagrammatic illustration showing a top plan view and a side elevation view taken along section line 8-8 (having divided mandrels in an open position) of another exemplary cinching device in accordance with aspects of the present inventive subject matter, with selected internal structures being depicted via dashed lines.
Figure 23:
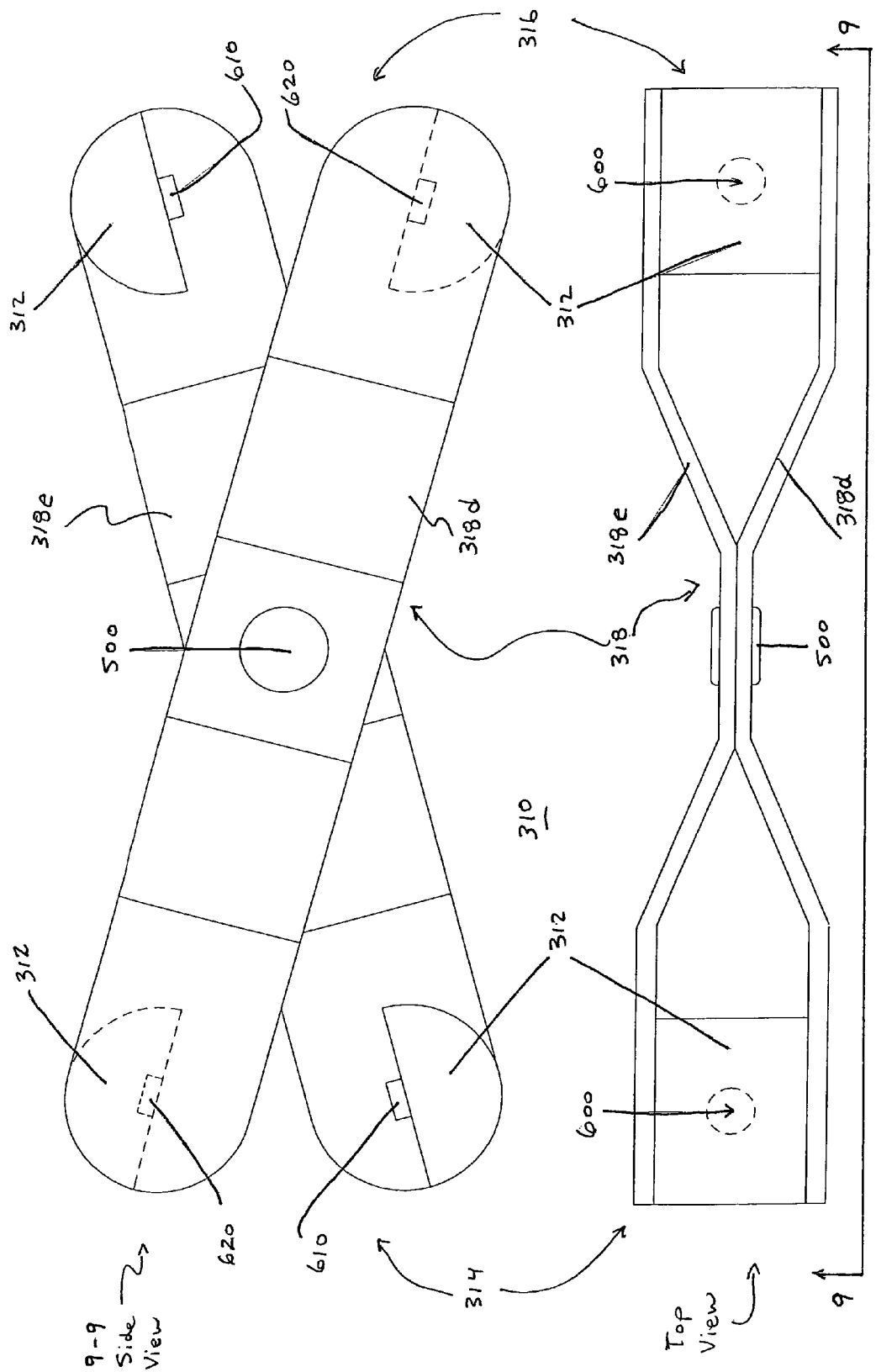
FIG. 23 is a diagrammatic illustration showing a top plan view and a side elevation view taken along section line 8-8 (having divided mandrels in an open position) of another exemplary cinching device in accordance with aspects of the present inventive subject matter, with selected internal structures being depicted via dashed lines.

As will be appreciated upon further reading of this specification, the embodiments of FIG. 22 and FIG. 23 beneficially employ divided or otherwise selectively splitable mandrels 312. In particular, the FIG. 22 embodiment employs forks similar to FIG. 20, except that each fork is divided into separate independent frames 314a' and 314a" and 316a' and 316a", each frame having attached thereto a respective mated half of the mandrels 312. Alternately, FIG. 23 shows another type of split mandrel cinching device 310 wherein the link portion 318 includes two frames 318d and 318e joined together pivotally about a formed rivet 500, each frame 318d and 318e having attached thereto at respective ends corresponding mated halves of the mandrels 312. As shown in FIG. 23, each mandrel 312 is cylindrical in shape, such that each divided part thereof corresponds to half a cylinder; and as shown in FIG. 22, the left mandrel 312 is half-cylindrical in shape, such that each divided part thereof corresponds to a quarter cylinder, and the right mandrel 312 is shaped like the mandrel surface 312''', such that each divided part thereof corresponds to half of the same. Again, the frames are suitably constructed of material similar to the mandrels 312 and/or the forks.

Mated halves of the mandrels 312 are suitably provided with alignment and/or locking fixtures 600. Each fixture 600 includes a pin 610 (or optionally a plurality of pins) and a recess 620 (or optionally a plurality of recesses) arranged on opposing mated halves of the mandrels 312. The recess 620 and pin 610 are arranged and/or dimensioned so that the recess 620 receives the pin 610 in close fitting relationship to one another when the mandrel halves are joined together. When the mandrel halves are joined together and the line 320 is looped over and pulled tight about the same, the fixtures 600 in conjunction with the line 320 hold the mandrels 312 together.

With reference again to FIGS. 7A and 7B, depending on the embodiment of the cinching device 310 employed, two exemplary methods are proposed for securing the load 100 to the deck or bed 210 of the trailer 200 with the cargo securing system 300, nominally termed herein a threading method and a slack-gathering method. Suitably, the threading method is used in conjunction with cinching devices 310 that do not have divided mandrels 312 or that do not have mandrels 312 that are detachable from the linking portion 318; and the slack-gathering method is used in conjunction with cinching devices 310 that do have divided mandrels 312 (see, e.g., FIGS. 22 and 23) or that do have mandrels 312 that are detachable from the linking portion 318 (see, e.g., FIG. 19).

The threading method suitably begins with the load 100 already resting on the deck 210 and raised therefrom by the dunnage 110, and with the line 320 unanchored to the side 230 of the trailer 200. Suitably, at the beginning of the threading method, the line 230 is mostly or entirely unwound from the winch 330 or otherwise a sufficient amount of the line 320 is drawn from the winch 330 and placed clear of the deck 210 and/or load 100. The leading end 322 of the lines 320 is then threaded through the cinching device 310 from the top and adjacent the first mandrel 312 (i.e., the mandrel 312 which is the closer of the two to the winch 330). While drawing out the line 320 through the cinching device 310, the leading end 322 is then passed around the load 100 between the deck 210 and the load 100 such that the line 320 at least partially encircles the load 100. Next, the leading end 322 of the line 320 is again threaded through the cinching device 310, this time from the bottom and adjacent the second mandrel 312 (i.e., the mandrel 312 which is the further of the two from the winch 330). While drawing out the line 320 down past the first mandrel 312, around the load 100 and up past the second mandrel 312, the leading end 322 is extended to the side 230 of the trailer 200 where it is anchored, suitably, opposite the winch 330 arranged on the side 220 of the trailer 200.

Optionally, if not already so located, the cinching device 310 is positioned at or near the top center of the load 100. Next, the winch 330 is operated to retract any slack in the line 320 and apply the desired tension thereto. As can now be appreciated, the applied tension is beneficially distributed in a substantially even and/or equal manner along the length of the line 320 insomuch as undesirable friction, bunching, chafing, binding and/or pinching of the line 320 has been minimized by the use of the herein described system 300 and/or method.

In contrast to the threading method, the slack-gathering method begins with drawing out from the winch 330 a projected amount of line 320 sufficient for the size of the load 100 to be secured. The leading edge 322 of the line 320 is then anchored to the side 230 of the trailer 200. Beneficially, as will be appreciated upon further reading of the present specification, the leading edge 322 of the line 320 may be permanently or semi-permanently affixed to the side 230 of the trailer 200, and/or may attach thereto via a second winch 330 arranged on the side 230 of the trailer 200.

The drawn out line 320 is then laid across the deck 210 substantially parallel to the dunnage 110 arranged thereon. Suitably, nearly equal amounts of slack in the line 320 are left to hang over both sides 220 and 230 of the trailer 200 or otherwise. The load 100 is now placed on the deck 210 so as to be raised therefrom by the dunnage 110. The slack on both sides of the load 100 is gathered so as to form a loop at or near a midpoint in each length of slack. Suitably, the loops are then drawn up and around their respective sides of the load 100 so that they meet at or near the top center of the load 100 where they are engaged by the cinching device 310.

Initially, the cinching device 310 is presented for acceptance of the loops, i.e., in the case of a divided mandrel cinching device 310 (see, e.g., FIGS. 22 and 23), the mandrels 312 are in an open position or otherwise separated, and in the case of a detachable mandrel cinching device 310 (see, e.g., FIG. 19), the mandrels 312 are separated. Then, the loops are positioned in respective ends 314 and 316 of the cinching device 310 and the mandrels 312 are closed around the loops, or inserted through the loops and reattached, as the case may be, such that the line 320 engages each mandrel 312 on its respective side.

Optionally, if not already so located, the cinching device 310 is positioned at or near the top center of the load 100. Next, the winch 330 (or both winches 230, if a second one is provided on the side 230 of the trailer 200) are selectively operated to retract any slack in the line 320 and apply the desired tension thereto. As can now be appreciated, the applied tension is beneficially distributed in a substantially even and/or equal manner along the length of the line 320 insomuch as undesirable friction, bunching, chafing, binding and/or pinching of the line 320 has been minimized by the use of the herein described system 300 and/or method.

Furthermore, it is to be appreciated that the use of a divided or detachable mandrel cinching device 310 in conjunction with the slack-gathering method described herein enables the elimination of the free end 322 on line 320. That is to say, both ends of the line 320 can optionally remain attached to the sides of the trailer while the load 100 is being placed on and secured to the trailer 200. Accordingly, there is the option for the second winch 330 allowing for pulling from both ends of the line 320 and thereby achieving a more even and/or equal application of tension.

Additionally, while not illustrated, any of the foregoing embodiments is optionally equipped with a secondary tether or a locking mechanism that may be used to tie and/or lock the cinching device 310 down to prevent loss, theft, etc. Suitably, however, the tether and/or locking mechanism does not otherwise interfere with the operation of the cinching device 310 as described herein.

It is to be appreciated that in connection with the particular exemplary embodiments presented herein certain structural and/or function features are described as being incorporated in and/or with defined elements and/or components. However, it is contemplated that these features may similarly be incorporated in and/or with other elements and/or components and/or in the other various embodiments where appropriate. For example, the depressions, channels and/or slopes formed in the mandrel surfaces shown in FIG. 20 may likewise be found on the outer surfaces of the sheaths 317 to the same or similar benefit.

It is also to be appreciated that different aspects of the exemplary embodiments may be selectively mixed and matched as appropriate to achieve other alternate embodiments suited for desired applications, the other alternate embodiments thereby realizing the respective advantages of the aspects incorporated therein. For example, a cinching device 310 may include any two different or like mandrel types selected from any of the exemplary embodiments presented herein.

Additionally, it is to be appreciated that certain elements described herein as incorporated together may under suitable circumstances be stand alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described herein as distinct from one another may be physically or functionally combined where appropriate.

In short, the invention has been described with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A load securing device with which a flexible tie down is engaged to secure a load to an object, said load securing device comprising:
a first mandrel that is substantially rigid and has opposing first and second ends through which an axis passes, said first mandel being able to rotate about the axis
ratcheting means that selectively limit a direction in which the first mandrel can be rotated about the axis;
a second mandrel that is substantially rigid; and,
a linkage joining the first and second mandrels to one another.

2. The load securing device of claim 1, wherein:
the first mandrel is arranged to engage with the tie down at a first position on the tie down such that the tie down wraps at least partially around the first mandrel; and,
the second mandrel is arranged to engage with the tie down at a second position on the tie down such that the tie down wraps at least partially around the second mandrel.

3. The load securing device of claim 1, wherein the linkage includes a movable joint arranged between the first and second mandrels.

4. A load securing device with which a flexible tie down is engaged to secure a load to an object, said load securing device comprising:
a first mandrel that is substantially rigid and includes an outer surface arranged to engage with the tie down such that the tie down wraps at least partially around the surface, wherein said outer surface has a trough formed therein;
a second mandrel that is substantially rigid; and,
a linkage joining the first and second mandrels to one another, wherein the linkage includes a movable joint arranged between the first and second mandrels.

5. The load securing device of claim 4, wherein a width of the trough varies along its length.

6. The load securing device of claim 4, wherein:
the first mandrel comprises a first cylindrical member having opposing first and second ends; and,
the second mandrel comprises a second cylindrical member having opposing first and second ends.

7. The load securing device of claim 4, wherein the first mandrel has opposing first and second ends that are engaged by the linkage such that the first mandrel can be rotated about an axis passing through the first and second ends of the first mandrel.

8. The load securing device of claim 1, wherein said linkage engages with the first and second mandrels so as to define first and second apertures, respectively, through which the tie down passes when the tie down is engaged with the first and second mandrels.

9. The load securing device of claim 4, wherein said linkage engages with the first and second mandrels so as to define first and second apertures, respectively, through which the tie down passes when the tie down is engaged with the first and second mandrels.

* * * * *